(12) United States Patent
Kamijima

(10) Patent No.: US 7,068,468 B2
(45) Date of Patent: Jun. 27, 2006

(54) THIN-FILM MAGNETIC HEAD, HEAD GIMBAL ASSEMBLY WITH THIN-FILM MAGNETIC HEAD AND MAGNETIC DISK APPARATUS WITH HEAD GIMBAL ASSEMBLY

(75) Inventor: Akifumi Kamijima, Tokyo (JP)

(73) Assignee: Co TDK Corporation, Chuo-Ku (JP)

( * ) Notice: Subject to any disclaimer, the term of this patent is extended or adjusted under 35 U.S.C. 154(b) by 396 days.

(21) Appl. No.: 10/303,849

(22) Filed: Nov. 26, 2002

(65) Prior Publication Data

US 2003/0099054 A1    May 29, 2003

(30) Foreign Application Priority Data

Nov. 29, 2001   (JP)   ............................. 2001-364000

(51) Int. Cl.
G11B 5/127   (2006.01)

(52) U.S. Cl. ..................................... 360/128

(58) Field of Classification Search ................ 360/128, 360/125, 294.3, 234.3, 126, 313
See application file for complete search history.

(56) References Cited

U.S. PATENT DOCUMENTS

| 5,991,113 | A   |     | 11/1999 | Meyer et al. |
|-----------|-----|-----|---------|--------------|
| 6,054,330 | A   | *   | 4/2000  | Phipps et al. ................... 438/3 |
| 6,317,280 | B1  | *   | 11/2001 | Nakajima et al. ............. 360/59 |
| 6,349,021 | B1  | *   | 2/2002  | Honda .......................... 360/317 |
| 6,359,752 | B1  | *   | 3/2002  | Imamura ................... 360/234.7 |
| 6,493,183 | B1  | *   | 12/2002 | Kasiraj et al. ............... 360/126 |
| 6,693,769 | B1  | *   | 2/2004  | Hsu et al. .................... 360/126 |
| 6,760,191 | B1  | *   | 7/2004  | Yan et al. .................... 360/128 |
| 6,822,819 | B1  | *   | 11/2004 | Gillis et al. ................... 360/59 |
| 2002/0191326 | A1 | * | 12/2002 | Xu et al. ....................... 360/75 |
| 2003/0035237 | A1 | * | 2/2003 | Lille ........................ 360/77.07 |
| 2003/0099054 | A1 | * | 5/2003 | Kamijima ..................... 360/59 |
| 2004/0027709 | A1 | * | 2/2004 | Hamaguchi et al. .......... 360/59 |
| 2004/0027719 | A1 | * | 2/2004 | Gider et al. ................. 360/128 |
| 2004/0027728 | A1 | * | 2/2004 | Coffey et al. ................ 360/313 |
| 2004/0037012 | A1 | * | 2/2004 | Nakanishi et al. .......... 360/317 |
| 2004/0070870 | A1 | * | 4/2004 | Hsiao et al. ................. 360/126 |
| 2004/0114268 | A1 | * | 6/2004 | Satoh et al. ................... 360/75 |
| 2004/0165305 | A1 | * | 8/2004 | Nishiyama .................... 360/75 |
| 2006/0034013 | A1 | * | 2/2006 | Kato et al. ................... 360/128 |

FOREIGN PATENT DOCUMENTS

| JP | 05-020635 | 1/1993 |
| JP | 5-347078 | 12/1993 |
| JP | 08-279120 | 10/1996 |
| JP | 10-69747 | 3/1998 |

* cited by examiner

*Primary Examiner*—Allen Cao
(74) *Attorney, Agent, or Firm*—Buchanan Ingersoll PC

(57) ABSTRACT

A thin-film magnetic head includes at least one thin-film magnetic head element with an ABS, and at least one heating means located at a position opposite to the ABS with respect to the at least one thin-film magnetic head element. The at least one heating means is energized to heat at least when the at least one thin-film magnetic head element operates.

35 Claims, 25 Drawing Sheets

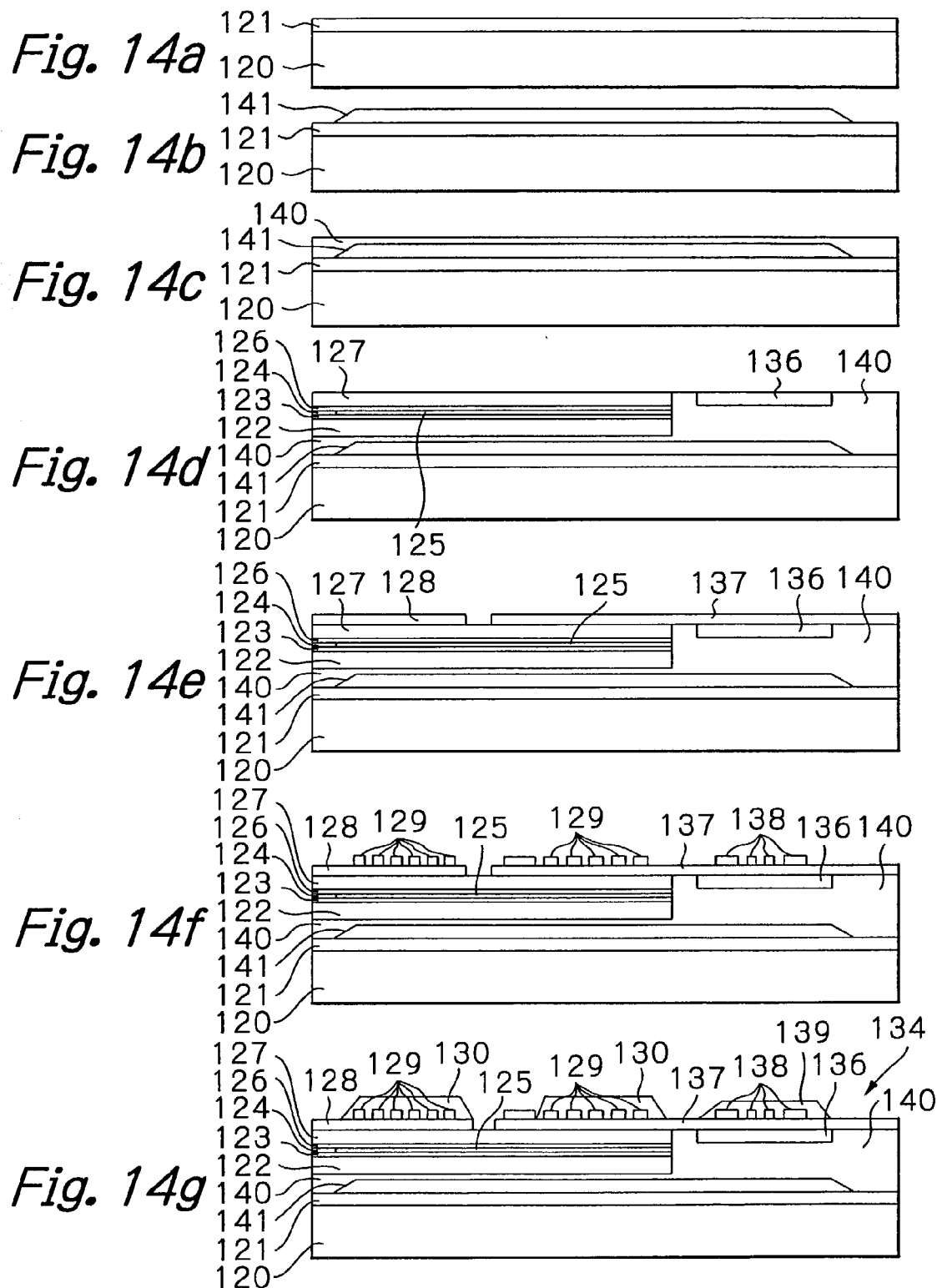

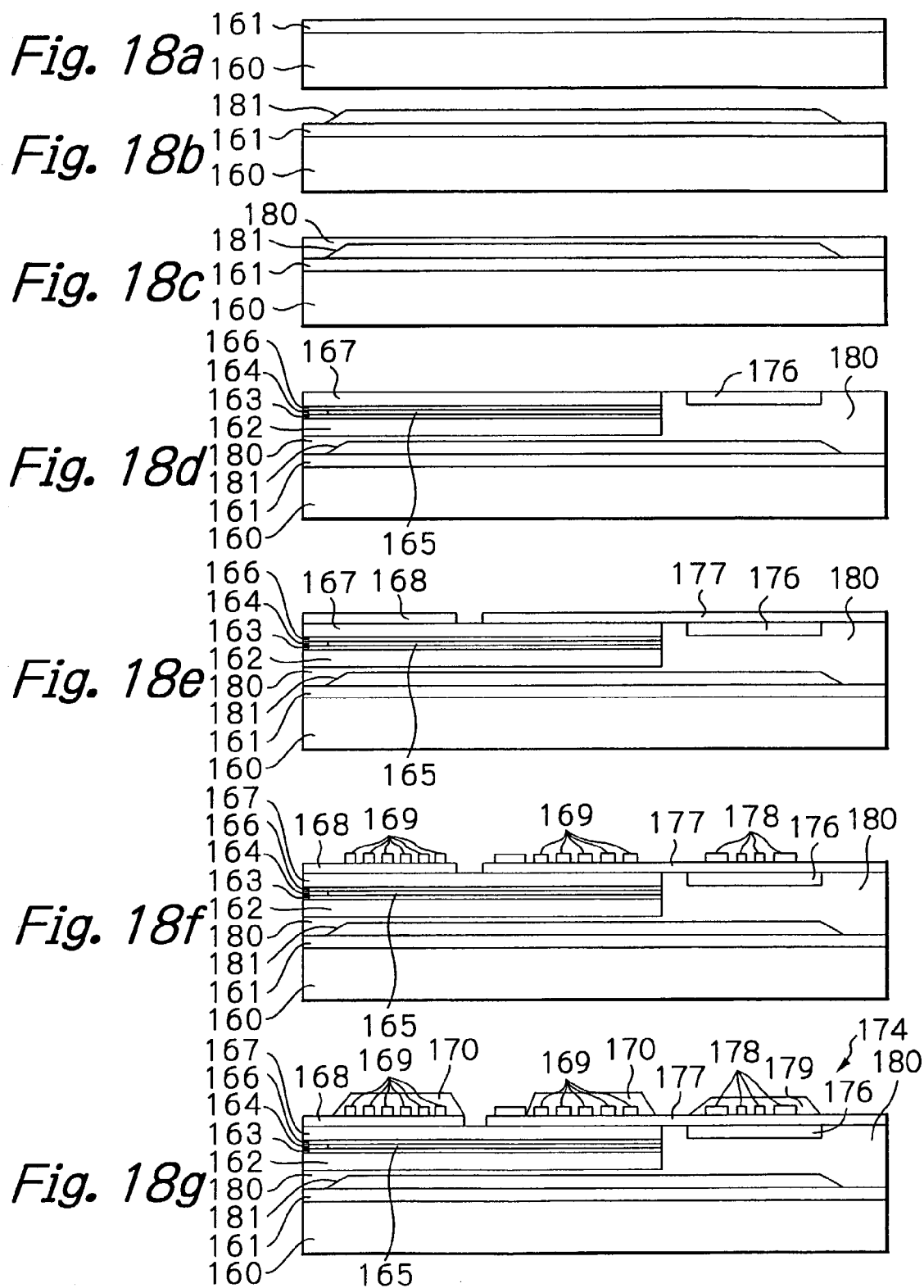

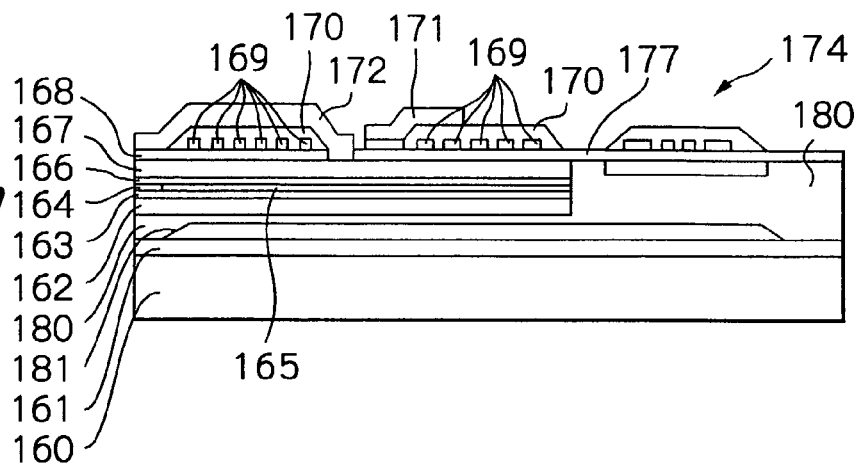
*Fig. 18h*
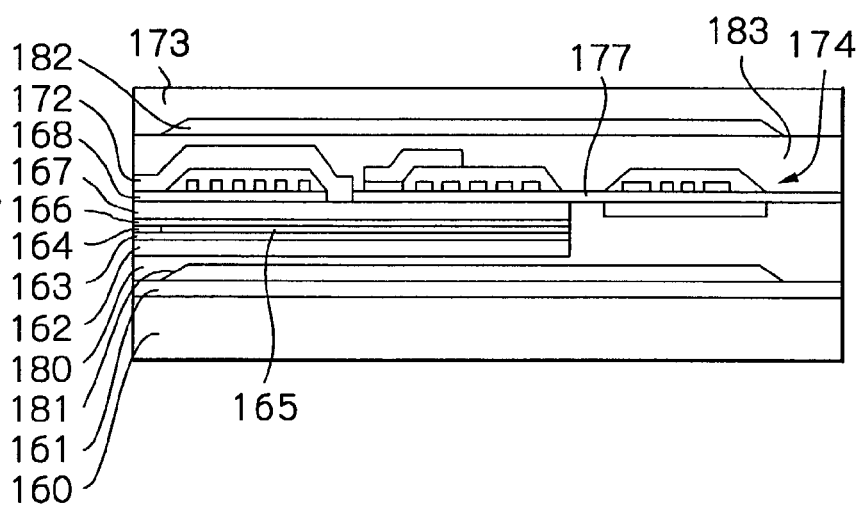
*Fig. 18i*
*Fig. 19*
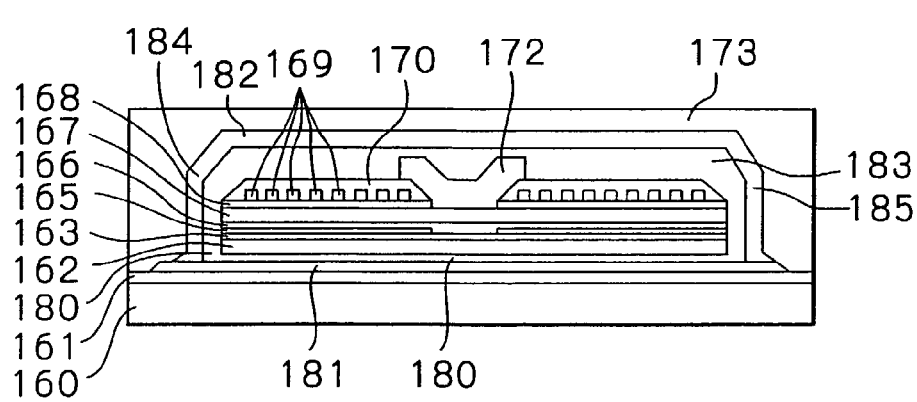

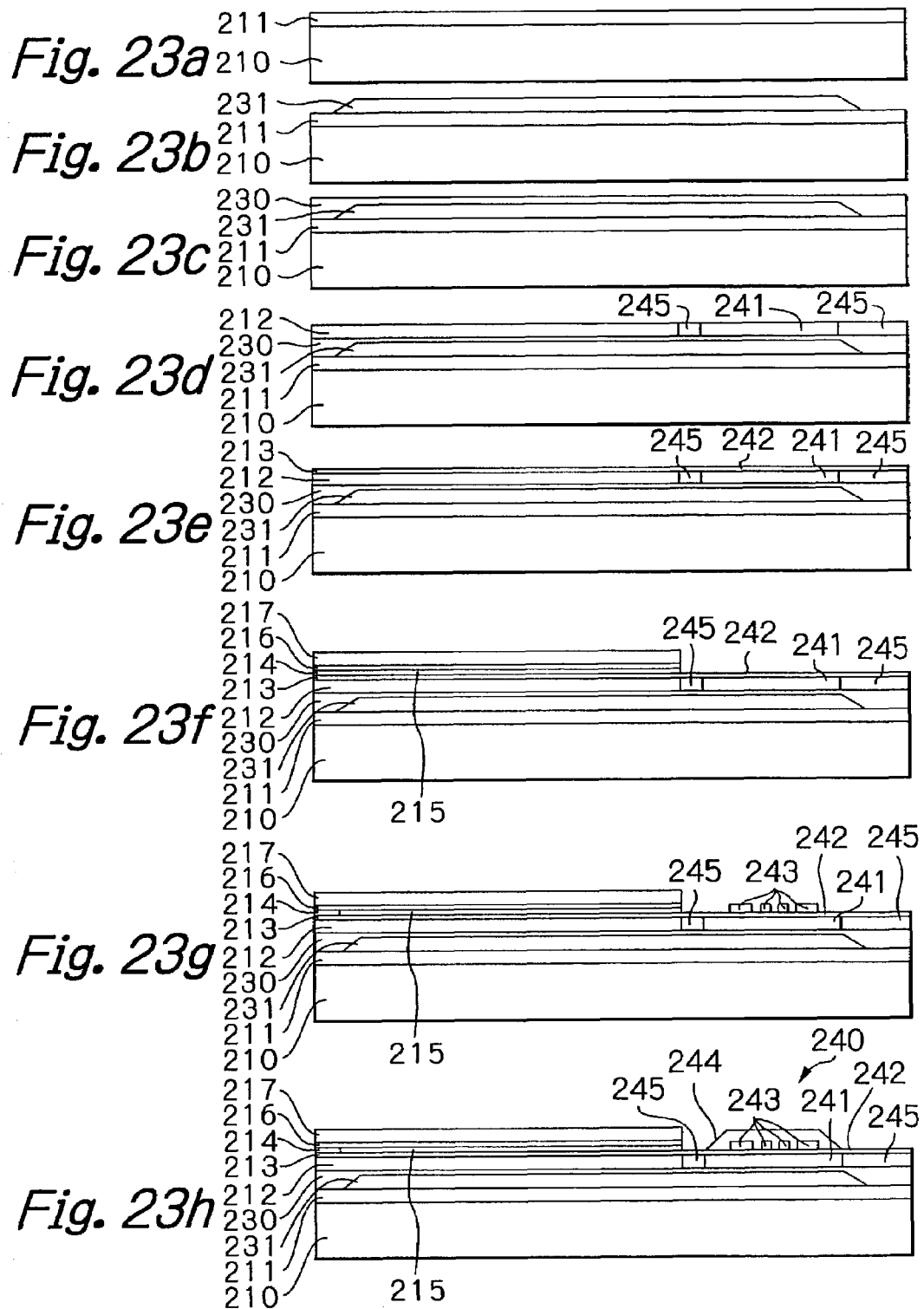

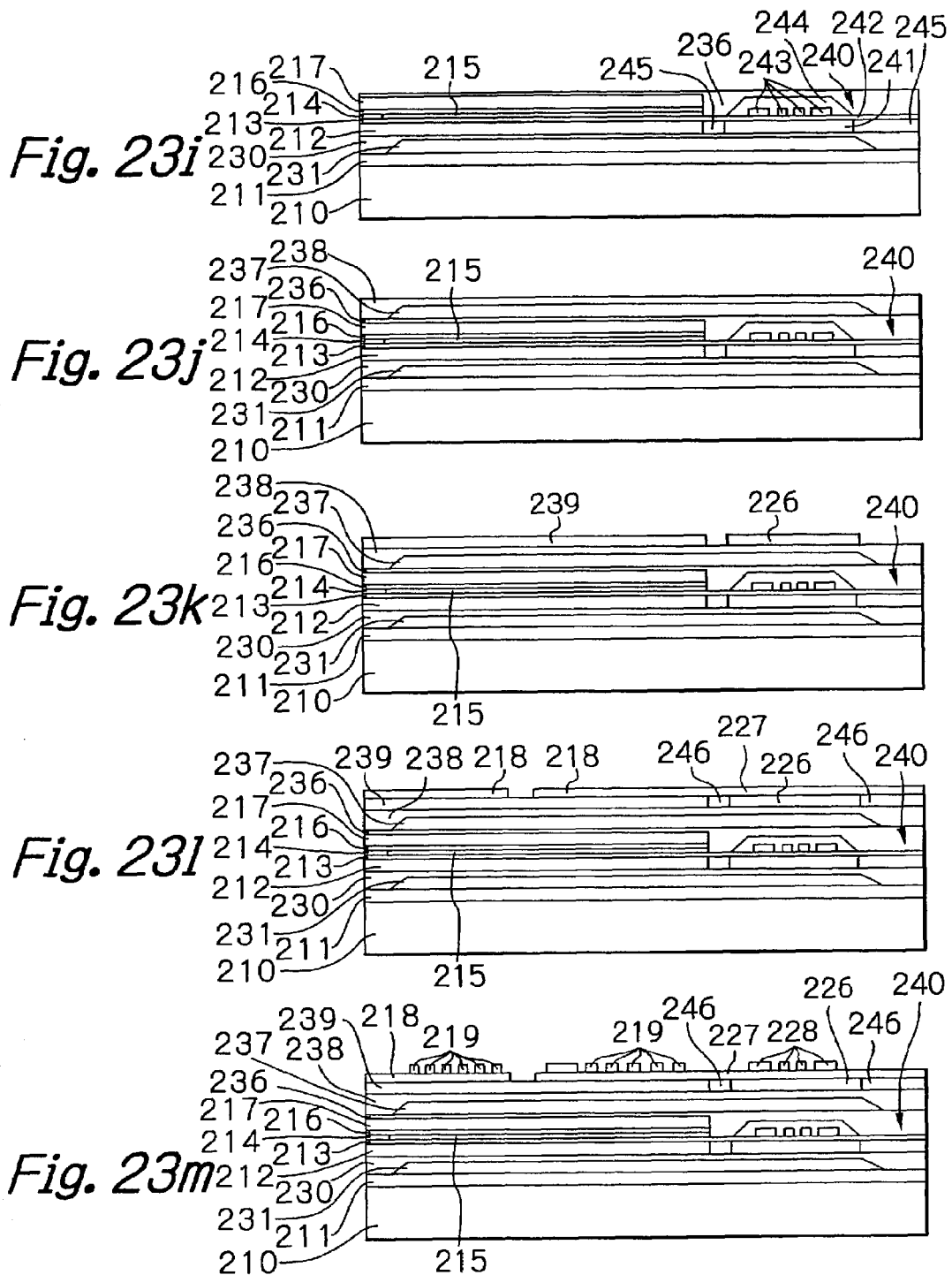

THIN-FILM MAGNETIC HEAD, HEAD GIMBAL ASSEMBLY WITH THIN-FILM MAGNETIC HEAD AND MAGNETIC DISK APPARATUS WITH HEAD GIMBAL ASSEMBLY

FIELD OF THE INVENTION

The present invention relates to a thin-film magnetic head, to a head gimbal assembly (HGA) with the thin-film magnetic head and to a magnetic disk apparatus with the HGA.

DESCRIPTION OF THE RELATED ART

In such magnetic disk apparatus, a thin-film magnetic head element for writing magnetic information into and/or reading magnetic information from a magnetic disk is in general formed on a magnetic head slider flying in operation above a rotating magnetic disk. The slider is fixed at a top end section of a suspension of the HGA.

Recently, track width of a thin-film magnetic head rapidly becomes narrower to satisfy the requirement forever increasing data storage capacities and densities in today's magnetic disk apparatus. If the track width becomes narrow, signal recording ability in a magnetic write head element to the magnetic disk will decrease and signal-reproducing ability in a magnetic read head element from the magnetic disk will also decrease.

For the sake of compensating such decreasing in the signal recording ability and/or the signal reproducing ability, recent thin-film magnetic head tends to have a small magnetic spacing between a magnetic head element of a magnetic head slider and a surface of a magnetic disk.

However, if a flying height of the magnetic head slider is lowered to make the magnetic spacing small, the probability of occurrence of collision between the magnetic head slider and the surface of the magnetic disk increases. This collision may cause a breakage of the magnetic head slider.

Japanese patent publication Nos. 05347078A and 10069747A disclose a method of decreasing the magnetic spacing by variably controlling the flying height of a magnetic head slider using a piezoelectric element attached between the magnetic head slider and a flexure for supporting this slider.

Such known method however requires a very complicated assembling process for additionally attaching a discrete piezoelectric element to the magnetic head slider. In addition, according to such known method, it is difficult to precisely keep a constant flying height among a plurality of magnetic head sliders because the flying height of each slider will differ from others due to manufacturing variations occurred during the assembling. Integral manufacturing of the piezoelectric element mainly made of a sintered ceramic and the magnetic head slider is impossible due to the difference in their process temperatures.

SUMMARY OF THE INVENTION

It is therefore an object of the present invention to provide a thin-film magnetic head, an HGA with the thin-film magnetic head and a magnetic disk apparatus with the HGA, whereby a small magnetic spacing can be attained and also variations of the magnetic spacing among thin-film magnetic heads can be reduced.

Another object of the present invention is to provide a thin-film magnetic head, an HGA with the thin-film magnetic head and a magnetic disk apparatus with the HGA, whereby a small magnetic spacing can be attained and also the magnetic spacing can be more precisely controlled.

According to the present invention, a thin-film magnetic head includes at least one thin-film magnetic head element with an air bearing surface (ABS), and at least one heating means located at a position opposite to the ABS with respect to the at least one thin-film magnetic head element. The at least one heating means is energized to heat at least when the at least one thin-film magnetic head element operates.

When the magnetic head element operates, the heating means (heater) is energized to produce a thermal expansion resulting that the magnetic head element slightly jut or protrude from the ABS. Thus, a magnetic spacing that is an air gap between the magnetic head element and the surface of the magnetic disk can be reduced only during the operations of the magnetic head element. This magnetic spacing can be precisely adjusted by controlling the heating value of the heating means. Such heating means can be formed in the same manufacturing process of the thin-film magnetic head and is integral with the thin-film magnetic head section. Thus, not only the manufacturing process becomes simple but also variations in the magnetic spacing among thin-film magnetic heads can be greatly reduced. Furthermore, because the magnetic spacing is reduced only when the head element is operated, it is possible to compensate decreasing in the signal recording ability and/or the signal reproducing ability due to narrowed track width without significantly increasing the probability of occurrence of collision between the magnetic head slider and the surface of the magnetic disk.

It is preferred that the at least one thin-film magnetic head element includes a magnetic write head element and/or a magnetic read head element.

It is also preferred that the at least one heating means includes a single heating means located at a position opposite to the ABS with respect to the magnetic write head element or the magnetic read head element, or that the at least one heating means includes two heating means located at positions opposite to the ABS with respect to the magnetic write head element and the magnetic read head element, respectively.

It is preferred that the head further includes at least one flexible layer laminated along the at least one thin-film magnetic head element and the at least one heating means. Thus, the thermal expansion of the magnetic head element section toward the ABS based upon the heating operation of the heating means becomes easy and the thermal expansion is oriented toward the easily deformable direction of this flexible layer.

It is also preferred that the at least one flexible layer includes a single flexible layer laminated below or above the at least one thin-film magnetic head element and the at least one heating means, or two flexible layers laminated below and above the at least one thin-film magnetic head element and the at least one heating means. If two flexible layers are provided, the thermal expansion of the magnetic head element section toward the ABS based upon the heating operation of the heating means becomes easier.

In this case, preferably additional flexible layers located at left and right sides of the at least one thin-film magnetic head element and the at least one heating means are provided. Since the at least one thin-film magnetic head element and the at least one heating means are surrounded by four flexible layers, the thermal expansion of the magnetic head element section toward the ABS becomes extremely easy and the thermal expansion is sufficiently oriented toward the easily deformable direction of the flexible layers.

It is also preferred that the thin-film magnetic head includes three flexible layers laminated along the two heating means, the magnetic write head element and the magnetic read head element. Two of the three flexible layers are laminated below and above the two heating means, the magnetic write head element and the magnetic read head element, and the remaining one of the three flexible layers is laminated between the two heating means and between the magnetic write head element and the magnetic read head element. By forming a middle flexible layer between the magnetic write and read head elements and between the two heating means, the thermal expansion of each magnetic head element section toward the ABS becomes more extremely easy.

In this case, preferably additional flexible layers located at left and right sides of the write and read head elements and the two heating means are provided. Since the write and read head elements and the two heating means are surrounded by four flexible layers, the thermal expansion of the magnetic head element section toward the ABS becomes extremely easy and the thermal expansion is sufficiently oriented toward the easily deformable direction of the flexible layers.

It is further preferred that the at least one heating means includes a heating conductor for producing Joule heat in response to current flowing there through.

According to the present invention, also, an HGA includes a thin-film magnetic head with at least one thin-film magnetic head element and at least one heating means, a support means for supporting the thin-film magnetic head, signal lead lines connected to the at least one thin-film magnetic head element, and power lead lines for supplying current to the at least one heating means. The at least one heating means is located at a position opposite to an air bearing surface with respect to the at least one thin-film magnetic head element, and energized to heat at least when the at least one thin-film magnetic head element operates.

According to the present invention, furthermore, a magnetic disk apparatus includes the at least one HGA as mentioned above and a current control means for controlling current supplied to the at least one heating means.

It is preferred that the current control means includes means for supplying current to the at least one heating means only when the at least one thin-film magnetic head element operates.

It is also preferred that the at least one thin-film magnetic head element includes a magnetic write head element or a magnetic read head element. In this case, the at least one heating means may include a single heating means located at a position opposite to the ABS with respect to the magnetic write head element or the magnetic read head element.

It is further preferred that the at least one thin-film magnetic head element includes a magnetic write head element and a magnetic read head element laminated with each other.

In this case, preferably the at least one heating means includes a single heating means located at a position opposite to the air bearing surface with respect to the magnetic write head element or the magnetic read head element. The current control means may include means for supplying current to the single heating means only when the magnetic write head element or the magnetic read head element operates.

Also, in this case, preferably, the at least one heating means includes two heating means located at positions opposite to the air bearing surface with respect to the magnetic write head element and the magnetic read head element, respectively. The current control means may include means for supplying current to the two heating means only when the magnetic write head element and the magnetic read head element operate, respectively.

Further objects and advantages of the present invention will be apparent from the following description of the preferred embodiments of the invention as illustrated in the accompanying drawings.

BRIEF DESCRIPTION OF THE DRAWINGS

FIGS. 14a to 14h show sectional views illustrating parts of a manufacturing process of the thin-film magnetic head in the second embodiment;

FIGS. 18a to 18i show sectional views illustrating parts of a manufacturing process of the thin-film magnetic head in the third embodiment;

FIG. 19 shows a sectional view illustrating a thin-film magnetic head in a modification of the third embodiment, indicated as a B—B line section of FIG. 5;

DESCRIPTION OF THE PREFERRED EMBODIMENTS

Figure 1:
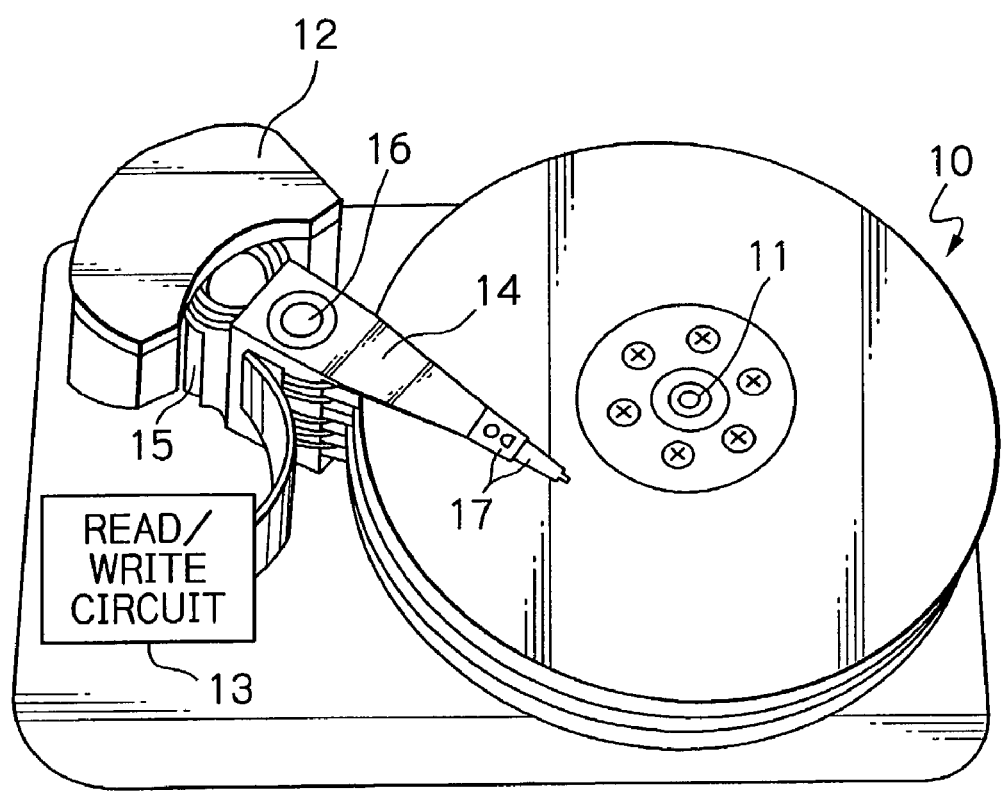
FIG. 1 shows an oblique view schematically illustrating main components of a magnetic disk apparatus in a first embodiment of the present invention.
Figure 2:
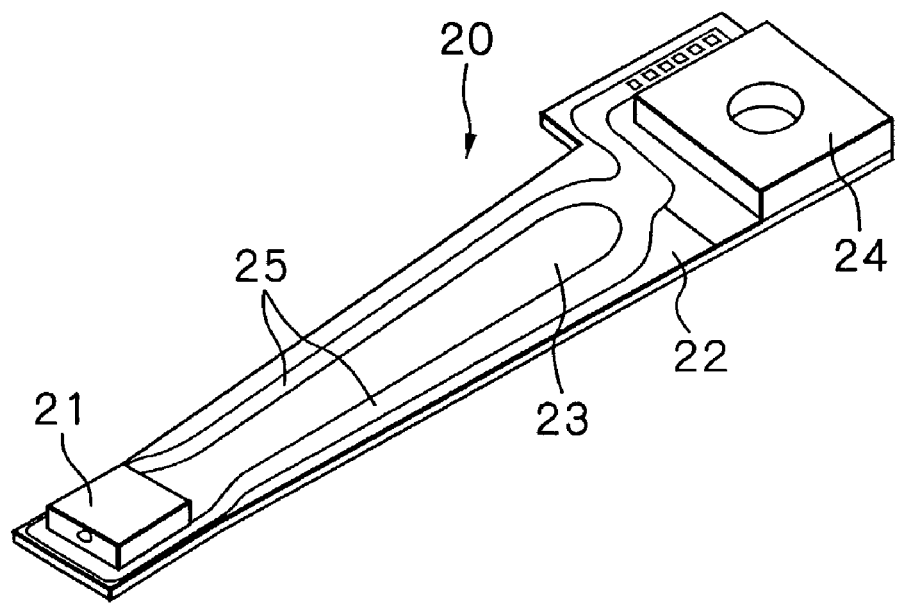
FIG. 2 shows an oblique view illustrating the whole of an HGA in the first embodiment.
Figure 3:
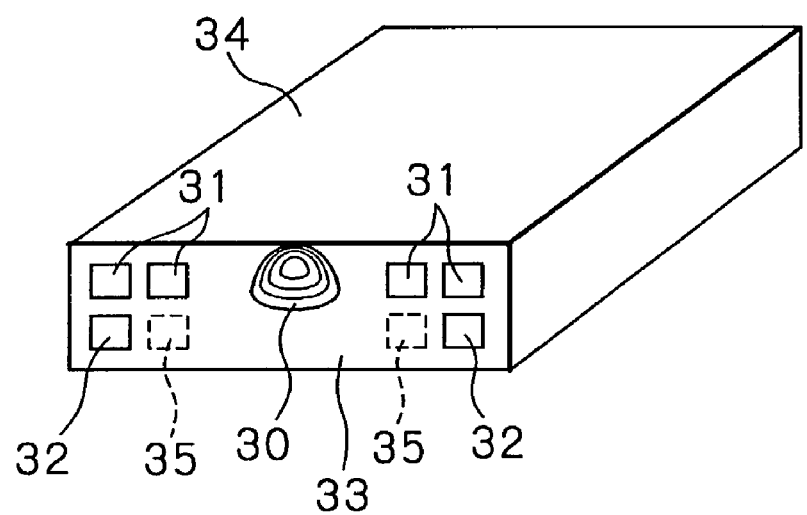
FIG. 3 shows an oblique view illustrating a magnetic head slider fixed at a top end section of the HGA in the first embodiment.

FIG. 1 schematically illustrates main components of a magnetic disk apparatus in a first embodiment of the present invention, FIG. 2 illustrates the whole of an HGA in the first embodiment, and FIG. 3 illustrates a magnetic head slider fixed at a top end section of the HGA in the first embodiment.

In FIG. 1, reference numeral 10 denotes a plurality of magnetic hard disks rotating around an axis 11, 12 denotes an assembly carriage device for positioning each thin-film magnetic head or magnetic head slider on a track of each disk, and 13 denotes a read/write circuit for controlling read and write operations and heating operations of the thin-film magnetic head, respectively. The assembly carriage device 12 has a plurality of drive arms 14 stacked along an axis 16. These drive arms 14 are capable of rotating around the axis 16 and driven by a voice coil motor (VCM) 15.

An HGA 17 is mounted on a top section of each arm 14. Each HGA 17 has a magnetic head slider mounted at its top end section so that the slider opposes to one surface (recording and reproducing surface) of each magnetic disk 10. In modifications, a single magnetic disk 10, a single drive arm 14, a single HGA 17 and a single thin-film magnetic head or magnetic head slider may be provided.

As shown in FIG. 2, the HGA is assembled by fixing a magnetic head slider 21 having at least one thin-film magnetic head element to a top end section of a suspension 20, and by electrically connecting one ends of trace conductors to terminal electrodes of the magnetic head slider 21.

The suspension 20 is substantially constituted by a load beam 22, a resilient flexure 23 fixed on the load beam 22, a base plate 24 formed at a base end section of the load beam 22, and a lead conductor member 25 fixed on the flexure 23 and provided with trace conductors and connection pads electrically connected both ends of the trace conductors.

A structure the suspension of the HGA according to the present invention is not limited to the aforementioned structure. Furthermore, although it is not shown, a head drive IC chip may be mounted on a middle of the suspension 20.

As shown in FIG. 3, the magnetic head slider in this embodiment has, on its element-forming surface 33, a magnetic write head element and a magnetic read head element 30 laminated each other, four signal electrode terminals 31 electrically connected to these elements and two heating current electrode terminals 32 electrically connected to a heater (not shown in FIG. 3). In this figure, reference numeral 34 denotes an ABS of the magnetic head slider and 35 indicated in a broken line denotes another two heating current electrode terminals in case of the fourth embodiment having two heaters.

Figure 4:
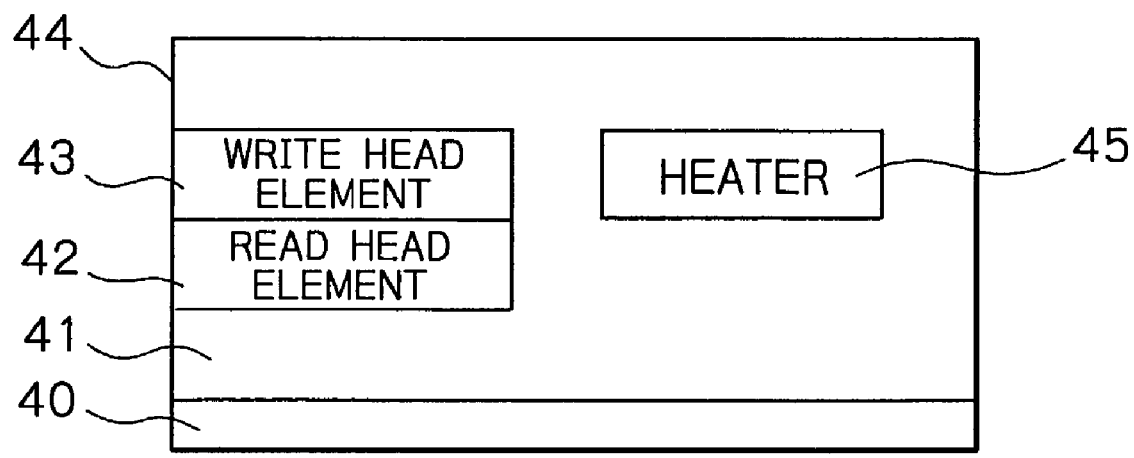
FIG. 4 shows a schematic view illustrating a configuration of a thin-film magnetic head in the first embodiment.

FIG. 4 schematically illustrates a configuration of the magnetic head slider or the thin-film magnetic head in this first embodiment.

As shown in this figure, the thin-film magnetic head in this embodiment has a substrate 40, an insulation layer 41 formed on the substrate 40, the magnetic read head element 42 and the magnetic write head element 43 sequentially laminated on the insulation layer 41, and the heater 45 formed at a position opposite to the ABS 44 with respect to the write head element 43. The heater 45 operates to jut or protrude end sections of the read and/or write head elements from the ABS due to its thermal expansion.

In this embodiment, the heater 45 is laminated at substantially the same level or height as that of the write head element 43 in order to simplify manufacturing processes. However, the lamination height of the heater according to the present invention is not limited to that in this embodiment. Namely, the heater 45 may be laminated at substantially the same level or height as that of the read head element 42, or at a level or height between the levels of the read head element 42 and the write head element 43 for example. Important is to form the heater at a position opposite to the ABS 44 with respect to the read and write head elements.

Figure 5:
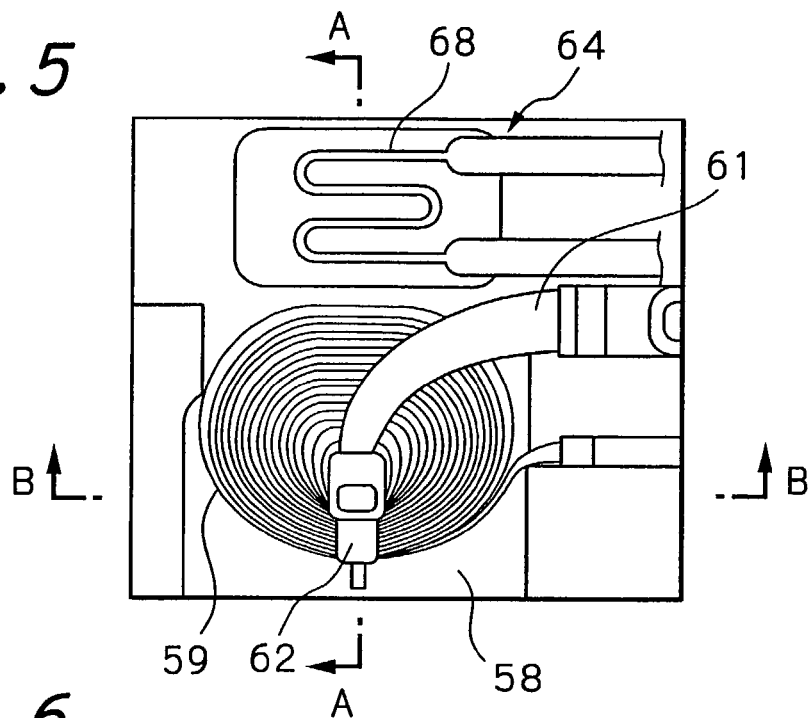
FIG. 5 shows a perspective plane view illustrating the thin-film magnetic head in the first embodiment, seen from an element-formed side.
Figure 6:
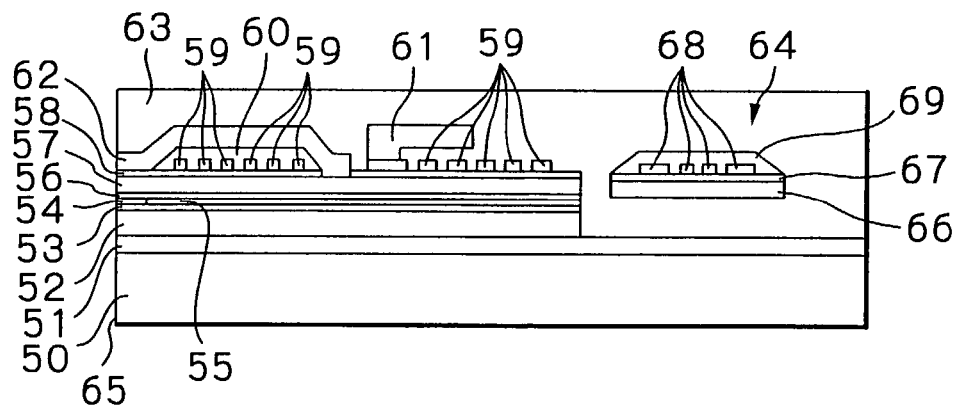
FIG. 6 shows an A—A line sectional view of FIG. 5.
Figure 7:
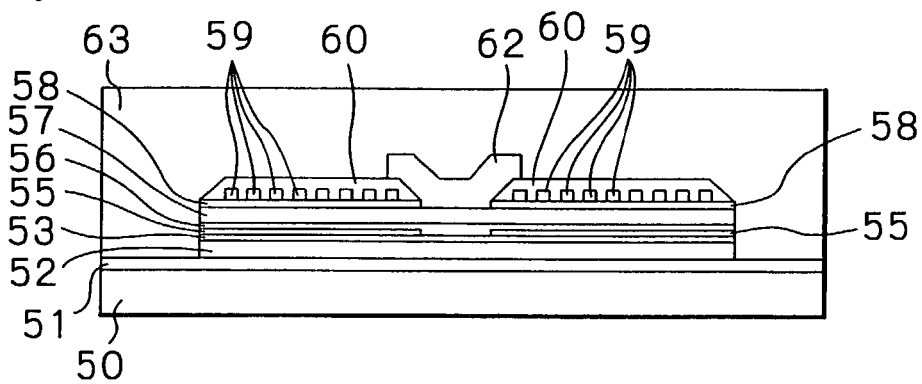
FIG. 7 shows a B—B line sectional view of FIG. 5.

Hereinafter, configuration of this embodiment will be described in detail. FIG. 5 illustrates the thin-film magnetic head in this embodiment, seen from an element-formed side, FIG. 6 illustrates an A—A line section of FIG. 5, and FIG. 7 illustrates a B—B line section of FIG. 5. In order to simplify the figure, the number of turns of coil indicated in FIG. 6 is smaller than that of FIG. 5.

In these figures, reference numeral 50 denotes a substrate made of for example an AlTiC ($Al_2O_3$—TiC), 51 denotes an insulation layer laminated on the substrate 50 and made of for example $Al_2O_3$, 52 denotes a lower shield layer laminated on the insulation layer 51 and made of for example NiFe, NiFeCo, CoFe, FeN or FeZrN, 53 denotes a lower shield gap layer laminated on the lower shield layer 52 and made of for example $Al_2O_3$ or DLC (diamond like carbon), 54 denotes a magnetoresistive effect (MR) layer such as for example an anisotropic magnetoresistive effect (AMR) single layer film, a giant magnetoresistive effect (GMR) multi-layered film or a tunneling magnetoresistive effect (TMR) multi-layered film, laminated on the lower shield gap layer 53, 55 denotes element-lead conductor layers made of for example Cu, provided with magnetic bias layers and connected to both ends of the MR layer 54, 56 denotes an upper shield gap layer laminated on the MR layer 54 and the element-lead conductor layers 55 and made of for example $Al_2O_3$ or DLC, 57 denotes an upper shield layer, which doubles as a lower magnetic pole layer, laminated on the upper shield gap layer 56 and made of for example NiFe, NiFeCo, CoFe, FeN or FeZrN, 58 denotes a magnetic gap layer laminated on the lower magnetic pole layer 57 and made of for example $Al_2O_3$ or DLC, 59 denotes a coil layer laminated on the magnetic gap layer 58 and made of for example Cu, 60 denotes a coil-insulation layer formed by for example a thermally cured resist layer to cover the coil layer 59, 61 denotes a coil-lead conductor layer made of for example Cu or NiFe and electrically connected to one end of the coil layer 59, 62 denotes an upper magnetic pole layer made of for example NiFe, NiFeCo, CoFe, FeN or FeZrN to form, with the lower magnetic pole layer 57, magnetic poles and a magnetic yoke, and 63 denotes a protection layer, respectively.

In this embodiment, the heater 64 is formed at a position opposite to the ABS 65 with respect to the magnetic write head elements and at substantially the same level or height as that of the write head element. The heater 64 is mainly configured by a heat-transfer layer 66 made of for example NiFe, an insulation layer 67 made of for example $Al_2O_3$, a heating conductor 68 made of for example Cu, Ni, Cr or NiCr, and a heating-conductor insulation layer 69 made of for example a thermally cured resist layer to cover the heating conductor 68.

FIGS. 8a to 8f illustrate, in A—A line sections of FIG. 5, parts of a manufacturing process of the thin-film magnetic head in this embodiment. Hereinafter, the manufacturing process of the thin-film magnetic head in this embodiment will be described in brief using these drawings.

Figure 8A:
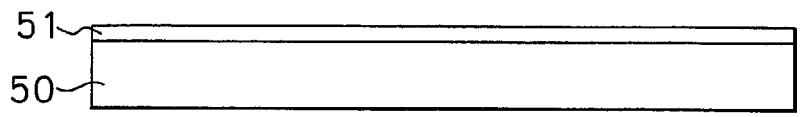
FIGS. 8a to 8f show sectional views illustrating parts of a manufacturing process of the thin-film magnetic head in the first embodiment.

First, as shown in FIG. 8a, the insulation layer 51 is deposited on the substrate 50.

Figure 8B:
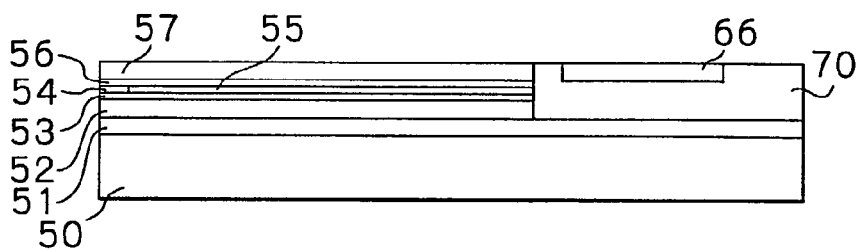

Then, as shown in FIG. 8b, the lower shield layer 52, the lower shield gap layer 53, the MR layer 54, the element-lead conductor layers 55 provided with the magnetic bias layers, the upper shield gap layer 56 and the upper shield layer 57 doubling as the lower magnetic pole layer are formed on the insulation layer 51. Also, behind them from the ABS, a flattening layer 70 and the heat-transfer layer 66 of the heater 64 are formed on the insulation layer 51. It is possible to fabricate both the upper shield layer 57 doubling as the lower magnetic pole layer and the heat-transfer layer 66 in the same process.

Figure 8C:
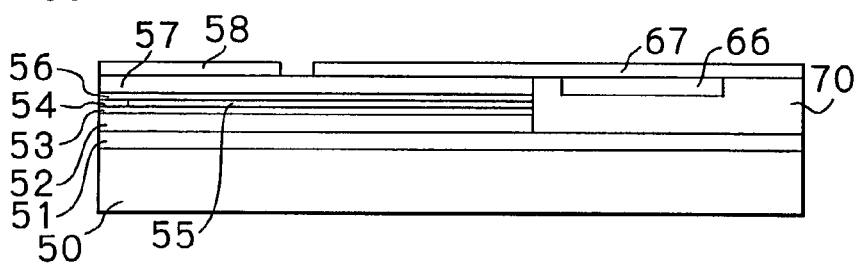

Then, as shown in FIG. 8c, the magnetic gap layer 58 and the insulation layer 67 are formed thereon. It is possible to fabricate both the magnetic gap layer 58 and the insulation layer 67 in the same process.

Figure 8D:
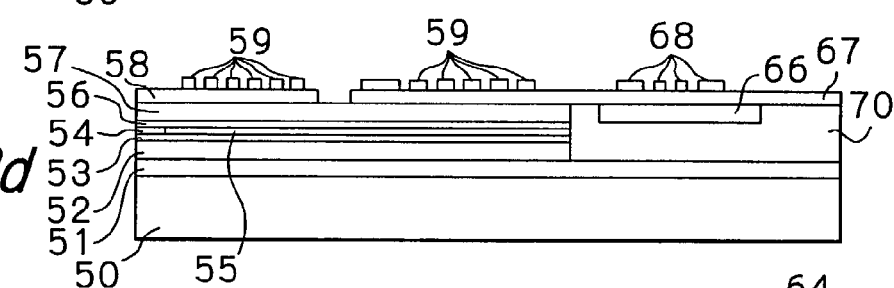

Then, as shown in FIG. 8d, the coil layer 59 and the heating conductor 68 are formed on the magnetic gap layer 58 and the insulation layer 67, respectively. If the same material is used for the coil layer 59 and the heating conductor 68, it is possible to fabricate both the coil layer 59 and the heating conductor 68 in the same process.

Figure 8E:
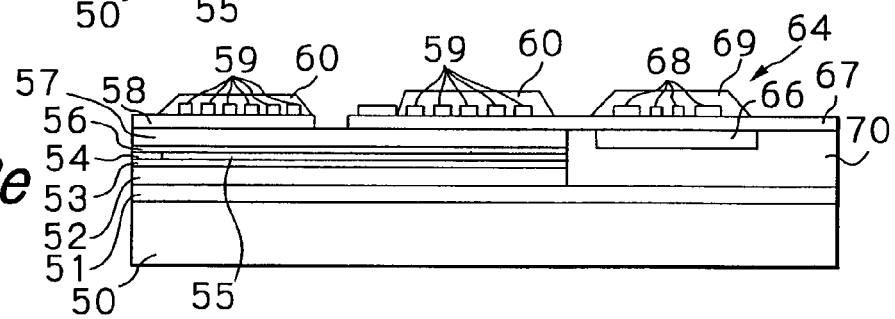
Figure 8F:
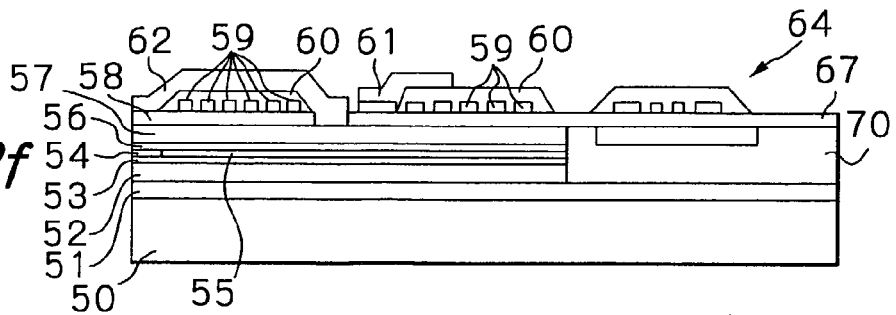

Thereafter, as shown in FIG. 8e, the coil-insulation layer 60 and the heating-conductor insulation layer 69 are formed to cover the coil layer 59 and the heating conductor 68, respectively. Then, the upper magnetic pole layer 62 and the coil-lead conductor 61 are formed thereon as shown in FIG. 8f and after that the protection layer 63 is deposited thereon to fabricate the thin-film magnetic head shown in FIG. 6. In this case, it is possible to fabricate both the coil-insulation layer 60 and the heating-conductor insulation layer 69 in the same process.

As mentioned above, in this embodiment, the heater 64 can be formed in the same manufacturing process of coil of the magnetic write head element and is integral with the thin-film magnetic head section. Thus, not only the manufacturing process becomes simple but also variations in the magnetic spacing among thin-film magnetic heads can be greatly reduced.

Figure 9:
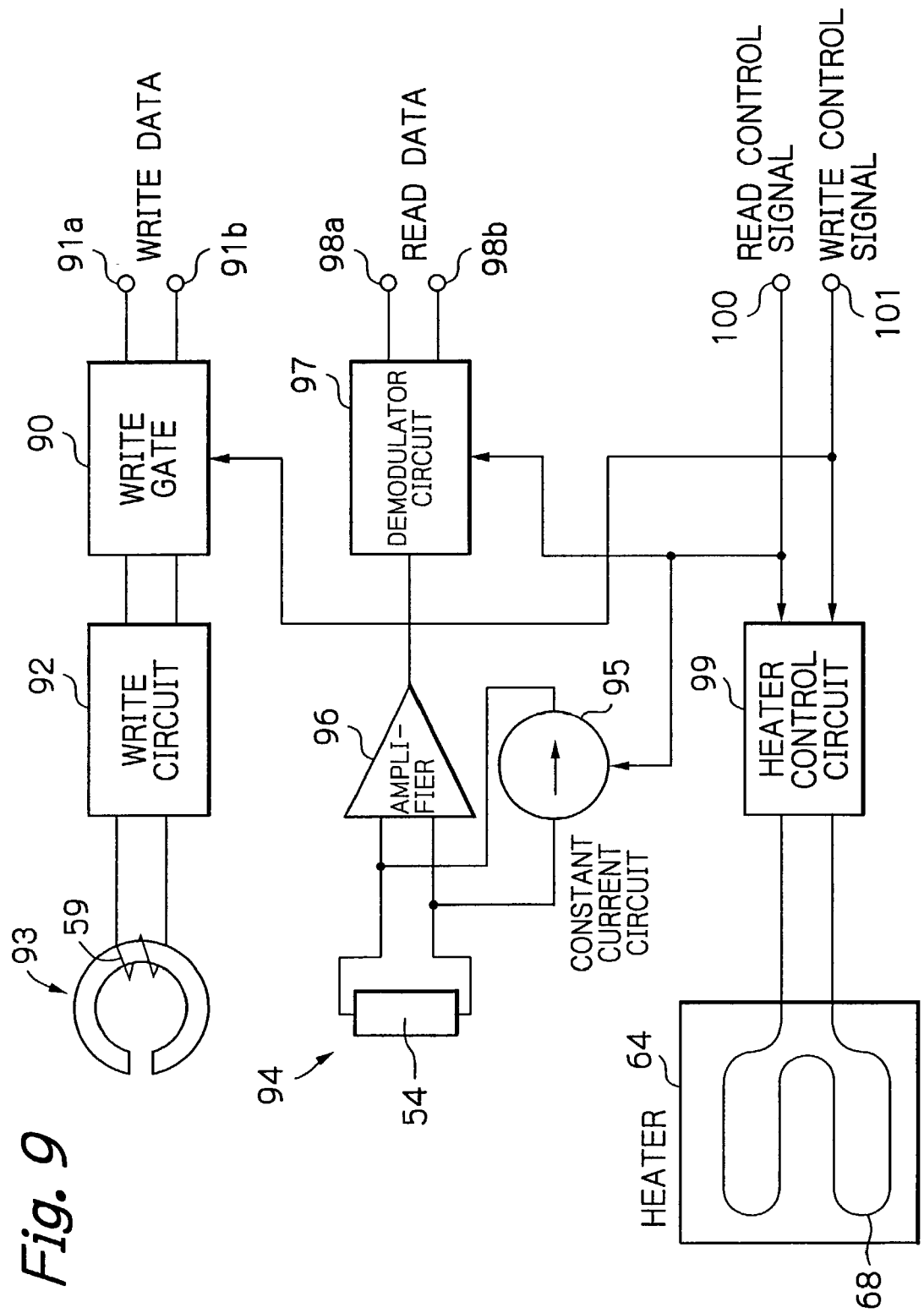
FIG. 9 shows a block diagram illustrating an example of a read/write circuit of the magnetic disk apparatus in the first embodiment.

FIG. 9 illustrates an example of the read/write circuit 13 (FIG. 1) of the magnetic disk apparatus in this embodiment.

In the figure, reference numeral 90 denotes a write gate for receiving write data via input terminals 91a and 91b, 92 denotes a write circuit, 93 denotes an inductive write head element including the lower magnetic pole layer 57, the magnetic gap layer 58, the upper magnetic pole layer 62 and the coil layer 59, 94 denotes an MR read head element including the MR layer 54, 95 denotes a constant current circuit for supplying a sense current to the read head element 94, 96 denotes an amplifier for amplifying output voltage from the read head element 94, 97 denotes a demodulator circuit for providing read data via output terminals 98a and 98b, 99 denotes a control circuit of the heater 64, and 100 and 101 denote control terminals for receiving a read control signal and a write control signal, respectively.

Write data applied via the input terminals 91a and 91b are supplied to the write gate 90. The write gate 90 supplies the applied write data to the write circuit 92 only when the write control signal provided thereto through the control terminal 101 instructs to execute write operations. The write circuit 92 generates write current to flow through the coil layer 59 in response to the write data supplied thereto, and thus magnetic recording on the magnetic disk 10 (FIG. 1) by the write head element 93 is performed.

The constant current circuit 95 supplies a constant sense current to the MR layer 54 only when the read control signal provided thereto through the control terminal 100 instructs to execute read operations. Signals reproduced by the read head element 94 is amplified at the amplifier 96, then demodulated at the demodulation circuit 97 and outputted via the output terminals 98a and 98b.

Figure 10:
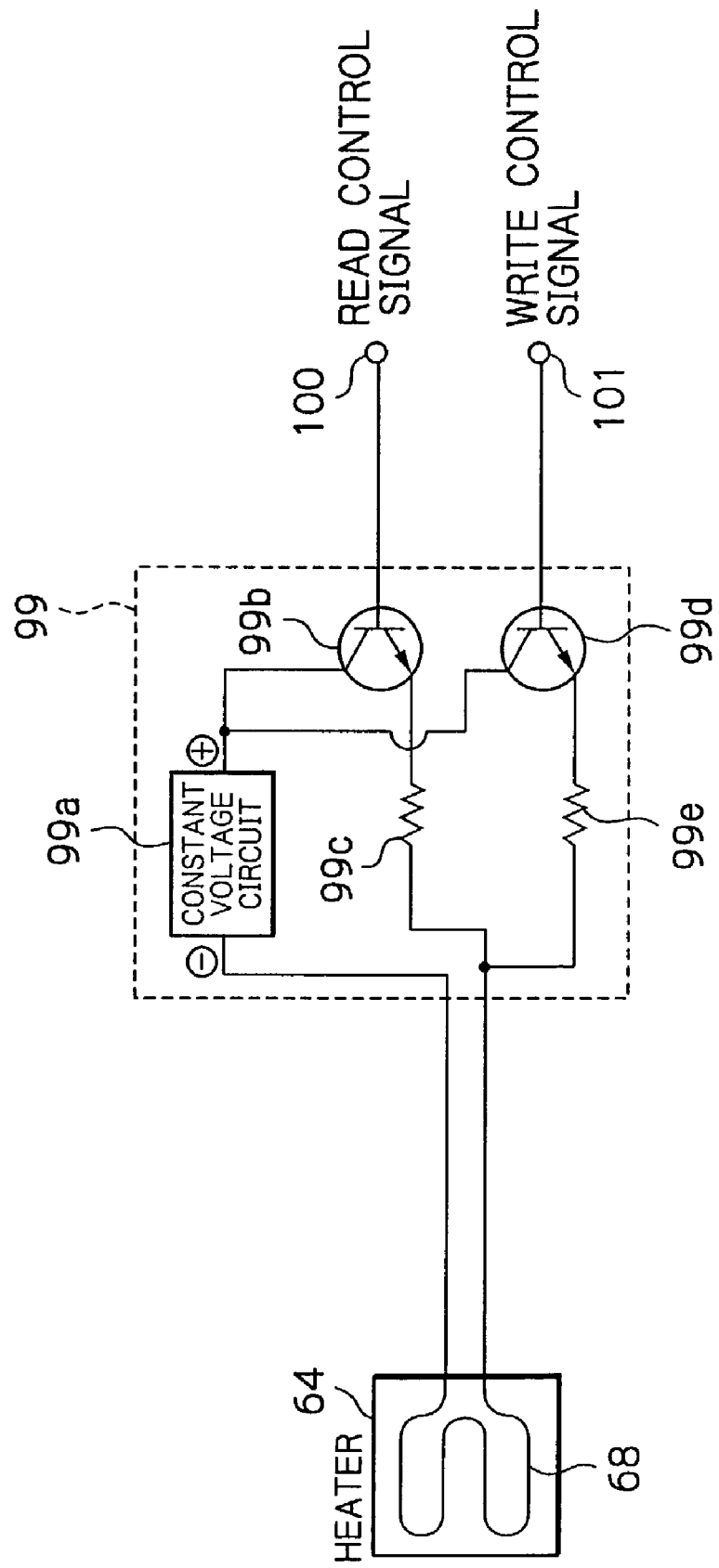
FIG. 10 shows a block diagram illustrating an example of a heater control circuit in the read/write circuit of FIG. 9.

The heater control circuit 99 in this embodiment has as shown in FIG. 10 a first series circuit of a constant voltage circuit 99a, a switching transistor 99b and current adjusting resistor 99c, and a second series circuit of the constant voltage circuit 99a, a switching transistor 99d and current adjusting resistor 99e. The first and second series circuits are connected in parallel across the heating conductor 68 of the heater 64. To gates of the switching transistors 99b and 99d, the control terminals 100 and 101 are connected, respectively.

When the write control signal indicates to do write operations, the switching transistor 99d turns on to flow a constant current adjusted by the resistor 99e through the heating conductor 68 of the heater 64. Also when the read control signal indicates to do read operations, the switching transistor 99b turns on to flow a constant current adjusted by the resistor 99c through the heating conductor 68 of the heater 64.

Since the constant currents flow through the heating conductor 68 of the heater 64 during the write operations and the read operations, the heater 64 and the portion around this heater 64 are heated to produce a thermal expansion resulting that the write head element and the read head element are slightly jut or protrude from the ABS 65. Thus, a magnetic spacing that is an air gap between the write and read head elements and the surface of the magnetic disk can be reduced only during the write operations and the read operations. Because the magnetic spacing is reduced only when the write and/or read head elements are operated, it is possible to compensate decreasing in the signal recording ability and/or the signal reproducing ability due to narrowed track width without significantly increasing the probability of occurrence of collision between the magnetic head slider and the surface of the magnetic disk. It should be noted that the magnetic spacing can be precisely adjusted by controlling current flowing through the heating conductor 68 and thus controlling the heating value of the heater 64.

It is apparent that the circuit configuration of the read/write circuit 13 is not limited to that shown in FIGS. 9 and 10. The write operations and the read operations may be specified signals other than the write control signal and the read control signal, respectively. It is desired that the heater 64 is energized during both the write operations and the read operations as aforementioned. However, the heater 64 may be energized only during the write operations or the read operations.

Figure 11:
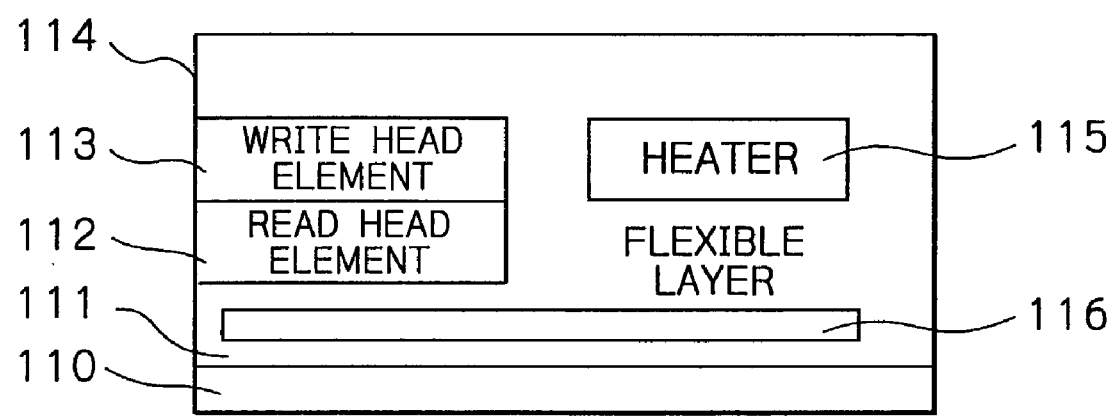
FIG. 11 shows a schematic view illustrating a configuration of a thin-film magnetic head in a second embodiment according to the present invention.

FIG. 11 schematically illustrates a configuration of the magnetic head slider or the thin-film magnetic head in a second embodiment according to the present invention.

As shown in this figure, the thin-film magnetic head in this embodiment has a substrate 110, an insulation layer 111 formed on the substrate 110, a flexible layer 116 formed on the insulation layer 111, and a magnetic read head element 112 and a magnetic write head element 113 sequentially laminated. A heater 115 is formed at a position opposite to the ABS with respect to the write head element 113. The heater 115 operates to jut or protrude end sections of the read and/or write head elements from the ABS due to its thermal expansion. The flexible layer 116 functions to smooth the movement of the magnetic head elements due to the thermal expansion.

In this embodiment, the heater 115 is laminated at substantially the same level or height as that of the write head element 113 in order to simplify manufacturing processes. However, the lamination height of the heater according to the present invention is not limited to that in this embodiment. Namely, the heater 115 may be laminated at substantially the same level or height as that of the read head element 112, or at a level or height between the levels of the read head element 112 and the write head element 113 for example. Important is to form the heater at a position opposite to the ABS with respect to the read and write head elements and above the flexible layer.

Figure 12:
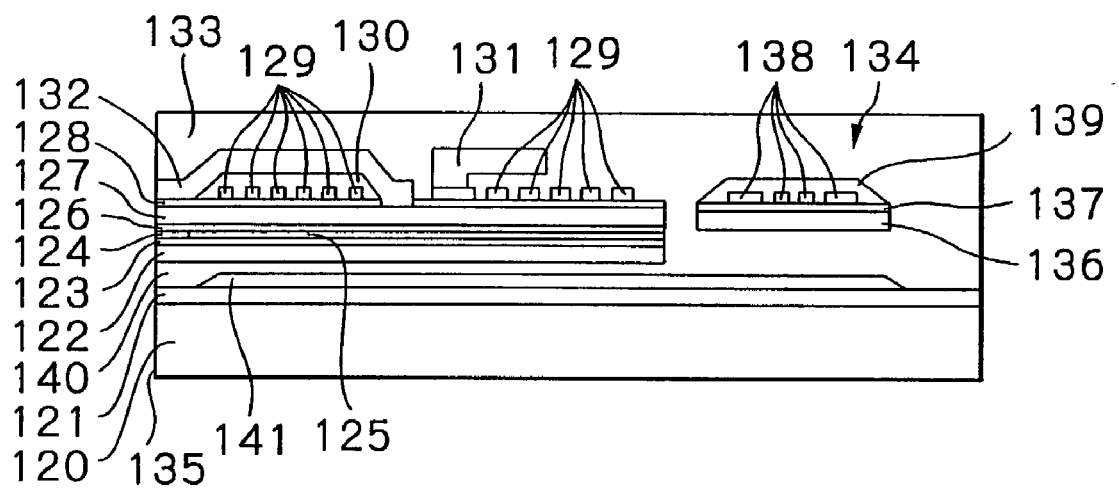
FIG. 12 shows a sectional view illustrating the thin-film magnetic head in the second embodiment, indicated as an A—A line section of FIG. 5.
Figure 13:
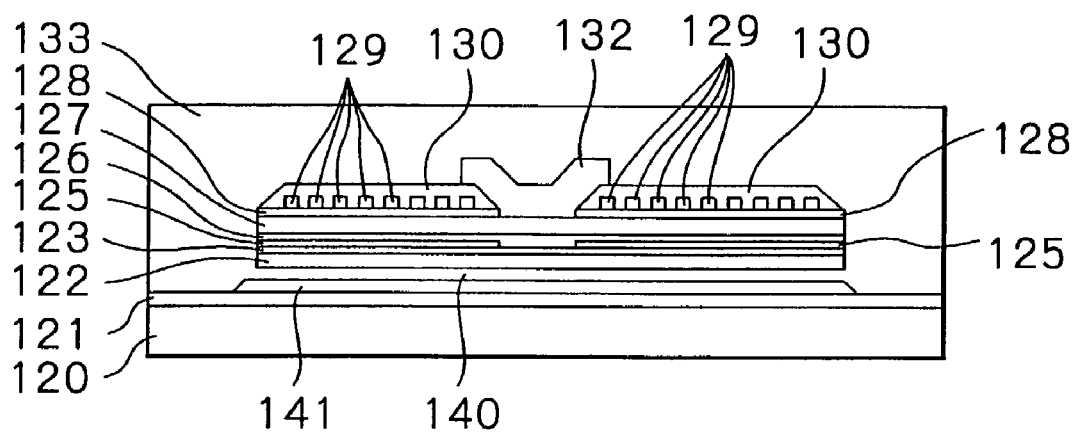
FIG. 13 shows a sectional view illustrating the thin-film magnetic head in the second embodiment, indicated as a B—B line section of FIG. 5.

Hereinafter, configuration of this embodiment will be described in detail. FIG. 12 illustrates the thin-film magnetic head in this embodiment, indicated as an A—A line section of FIG. 5, and FIG. 13 illustrates the thin-film magnetic head, indicated as a B—B line section of FIG. 5.

In these figures, reference numeral 120 denotes a substrate made of for example an AlTiC ($Al_2O_3$—TiC), 121 denotes an insulation layer laminated on the substrate 120 and made of for example $Al_2O_3$, 141 denotes a flexible layer laminated on the insulation layer 121 and made of for example a thermally cured resist layer, 140 denotes a flattening layer formed on the flexible layer 141, 122 denotes a lower shield layer laminated on the flattening layer 140 and made of for example NiFe, NiFeCo, CoFe, FeN or FeZrN, 123 denotes a lower shield gap layer laminated on the lower shield layer 122 and made of for example $Al_2O_3$ or DLC, 124 denotes an MR layer such as for example an AMR single layer film, a GMR multi-layered film or a TMR multi-layered film, laminated on the lower shield gap layer 123, 125 denotes element-lead conductor layers made of for example Cu, provided with magnetic bias layers and connected to both ends of the MR layer 124, 126 denotes an upper shield gap layer laminated on the MR layer 124 and the element-lead conductor layers 125 and made of for example $Al_2O_3$ or DLC, 127 denotes an upper shield layer, which doubles as a lower magnetic pole layer, laminated on the upper shield gap layer 126 and made of for example NiFe, NiFeCo, CoFe, FeN or FeZrN, 128 denotes a magnetic gap layer laminated on the lower magnetic pole layer 127 and made of for example $Al_2O_3$ or DLC, 129 denotes a coil layer laminated on the magnetic gap layer 128 and made of for example Cu, 130 denotes a coil-insulation layer formed by for example a thermally cured resist layer to cover the coil layer 129, 131 denotes a coil-lead conductor layer made of for example Cu or NiFe and electrically connected to one end of the coil layer 129, 132 denotes an upper magnetic pole layer made of for example NiFe, NiFeCo, CoFe, FeN or FeZrN to form, with the lower magnetic pole layer 127, magnetic poles and a magnetic yoke, and 133 denotes a protection layer, respectively.

In this embodiment, the heater 134 is formed at a position, above the flexible layer 141, opposite to the ABS 135 with respect to the magnetic write head elements and at substantially the same level or height as that of the write head element. The heater 134 is mainly configured by a heat-transfer layer 136 made of for example NiFe, an insulation layer 137 made of for example $Al_2O_3$, a heating conductor 138 made of for example Cu, Ni, Cr or NiCr, and a heating-conductor insulation layer 139 made of for example a thermally cured resist layer to cover the heating conductor 138.

FIGS. 14a to 14h illustrate, in A—A line sections of FIG. 5, parts of a manufacturing process of the thin-film magnetic head in this embodiment. Hereinafter, the manufacturing process of the thin-film magnetic head in this embodiment will be described in brief using these drawings.

First, as shown in FIG. 14a, the insulation layer 121 is deposited on the substrate 120.

Then, as shown in FIG. 14b, the flexible layer 141 is laminated on the insulation layer 121 by thermally curing a resist material.

Then, as shown in FIG. 14c, the flattening layer 140 is formed on the insulation layer 121 and the flexible layer 141.

Then, as shown in FIG. 14d, the lower shield layer 122, the lower shield gap layer 123, the MR layer 124, the element-lead conductor layers 125 provided with the magnetic bias layers, the upper shield gap layer 126 and the upper shield layer 127 doubling as the lower magnetic pole layer are formed on the flattening layer 140. Also, behind them from the ABS, a flattening layer 140 and the heat-transfer layer 136 of the heater 134 are formed. It is possible to fabricate both the upper shield layer 127 doubling as the lower magnetic pole layer and the heat-transfer layer 136 in the same process.

Then, as shown in FIG. 14e, the magnetic gap layer 128 and the insulation layer 137 are formed thereon. It is possible to fabricate both the magnetic gap layer 128 and the insulation layer 137 in the same process.

Then, as shown in FIG. 14f, the coil layer 129 and the heating conductor 138 are formed on the magnetic gap layer 128 and the insulation layer 137, respectively. If the same material is used for the coil layer 129 and the heating conductor 138, it is possible to fabricate both the coil layer 129 and the heating conductor 138 in the same process.

Figure 14H:
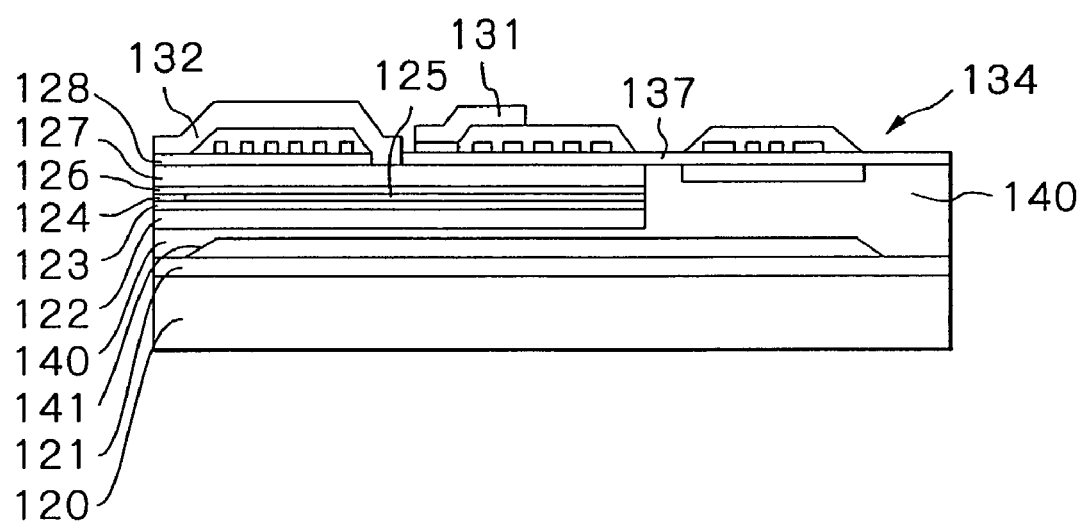

Thereafter, as shown in FIG. 14g, the coil-insulation layer 130 and the heating-conductor insulation layer 139 are formed to cover the coil layer 129 and the heating conductor 138, respectively. Then, the upper magnetic pole layer 132 and the coil-lead conductor 131 are formed thereon as shown in FIG. 14h and after that the protection layer 133 is deposited thereon to fabricate the thin-film magnetic head shown in FIG. 12. In this case, it is possible to fabricate both the coil-insulation layer 130 and the heating-conductor insulation layer 139 in the same process.

As mentioned above, in this embodiment, the heater 134 can be formed in the same manufacturing process of coil of the magnetic write head element and is integral with the thin-film magnetic head section. Thus, not only the manufacturing process becomes simple but also variations in the magnetic spacing among thin-film magnetic heads can be greatly reduced.

Configurations, operations and modifications of a read/write circuit of the magnetic disk apparatus in this embodiment are substantially the same as those in the first embodiment. Namely, since the constant currents flow through the heating conductor 138 of the heater 134 during the write operations and the read operations, the heater 134 and the portion around this heater 134 are heated to produce a thermal expansion resulting that the write head element and the read head element are slightly jut or protrude from the ABS 135. Thus, a magnetic spacing that is an air gap between the write and read head elements and the surface of the magnetic disk can be reduced only during the write operations and the read operations. Because the magnetic spacing is reduced only when the write and/or read head elements are operated, it is possible to compensate decreasing in the signal recording ability and/or the signal reproducing ability due to narrowed track width without significantly increasing the probability of occurrence of collision between the magnetic head slider and the surface of the magnetic disk. It should be noted that the magnetic spacing can be precisely adjusted by controlling current flowing through the heating conductor 138 and thus controlling the heating value of the heater 134.

Particularly, according to this embodiment, the flexible layer 141 is laminated below the magnetic head elements and the heater 134, in other words at the side of the substrate 120 with respect to the magnetic head elements and the heater 134. Thus, the thermal expansion of the magnetic head element section toward the ABS based upon the heating operation of the heater 134 becomes easy and the thermal expansion is oriented toward the easily deformable direction of this flexible layer 141. In modification, the flexible layer 141 may be laminated above the magnetic head elements and the heater 134, in other words at the opposite side from the substrate 120 with respect to the magnetic head elements and the heater 134.

Figure 15:
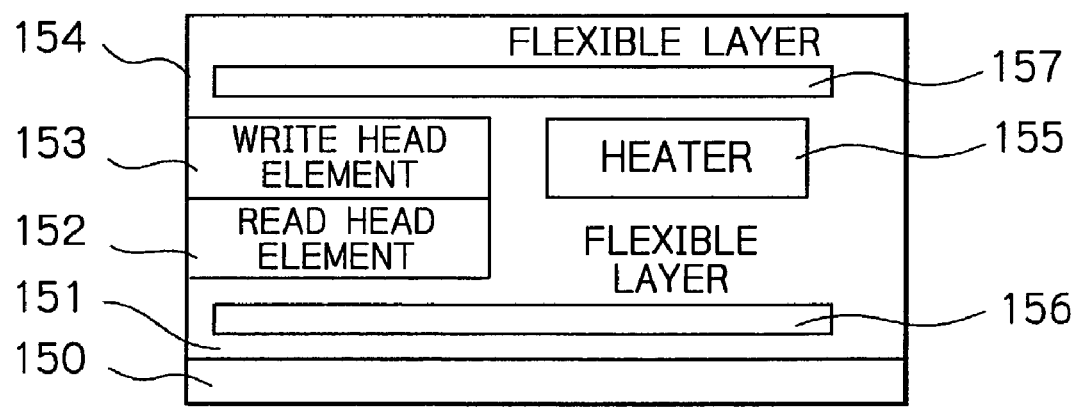
FIG. 15 shows a schematic view illustrating a configuration of a thin-film magnetic head in a third embodiment according to the present invention.

FIG. 15 schematically illustrates a configuration of the magnetic head slider or the thin-film magnetic head in a third embodiment according to the present invention.

As shown in this figure, the thin-film magnetic head in this embodiment has a substrate 150, an insulation layer 151 formed on the substrate 150, a lower flexible layer 156 formed on the insulation layer 151, and a magnetic read head element 152 and a magnetic write head element 153 sequentially laminated. A heater 155 is formed at a position opposite to the ABS with respect to the write head element 153. Above the write head element 153 and the heater 155, an upper flexible layer 157 is laminated. The heater 155 operates to jut or protrude end sections of the read and/or write head elements from the ABS due to its thermal expansion. The lower and upper flexible layers 156 and 157 function to smooth the movement of the magnetic head elements due to the thermal expansion.

In this embodiment, the heater 155 is laminated at substantially the same level or height as that of the write head element 153 in order to simplify manufacturing processes. However, the lamination height of the heater according to the present invention is not limited to that in this embodiment. Namely, the heater 155 may be laminated at substantially the same level or height as that of the read head element 152, or at a level or height between the levels of the read head element 152 and the write head element 153 for example. Important is to form the heater at a position opposite to the ABS with respect to the read and write head elements and between the lower and upper flexible layers 156 and 157.

Figure 16:
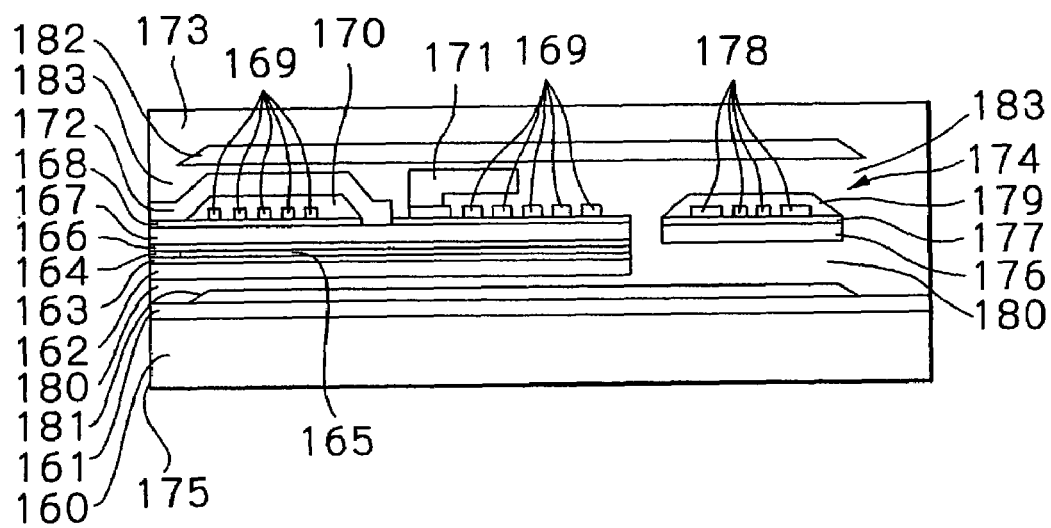
FIG. 16 shows a sectional view illustrating the thin-film magnetic head in the third embodiment, indicated as an A—A line section of FIG. 5.
Figure 17:
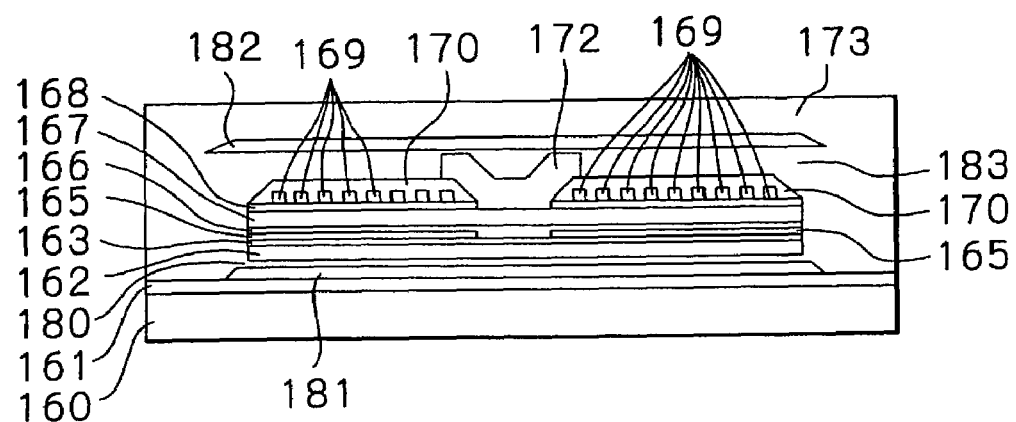
FIG. 17 shows a sectional view illustrating the thin-film magnetic head in the third embodiment, indicated as a B—B line section of FIG. 5.

Hereinafter, configuration of this embodiment will be described in detail. FIG. 16 illustrates the thin-film magnetic head in this embodiment, indicated as an A—A line section of FIG. 5, and FIG. 17 illustrates the thin-film magnetic head, indicated as a B—B line section of FIG. 5.

In these figures, reference numeral 160 denotes a substrate made of for example an AlTiC ($Al_2O_3$—TiC), 161 denotes an insulation layer laminated on the substrate 160 and made of for example $Al_2O_3$, 181 denotes a lower flexible layer laminated on the insulation layer 161 and made of for example a thermally cured resist layer, 180 denotes a flattening layer formed on the lower flexible layer 181, 162 denotes a lower shield layer laminated on the flattening layer 180 and made of for example NiFe, NiFeCo, CoFe, FeN or FeZrN, 163 denotes a lower shield gap layer laminated on the lower shield layer 162 and made of for example $Al_2O_3$ or DLC, 164 denotes an MR layer such as for example an AMR single layer film, a GMR multi-layered film or a TMR multi-layered film, laminated on the lower shield gap layer 163, 165 denotes element-lead conductor layers made of for example Cu, provided with magnetic bias layers and connected to both ends of the MR layer 164, 166 denotes an upper shield gap layer laminated on the MR layer 164 and the element-lead conductor layers 165 and made of for example $Al_2O_3$ or DLC, 167 denotes an upper shield layer, which doubles as a lower magnetic pole layer, laminated on the upper shield gap layer 166 and made of for example NiFe, NiFeCo, CoFe, FeN or FeZrN, 168 denotes a magnetic gap layer laminated on the lower magnetic pole layer 167 and made of for example $Al_2O_3$ or DLC, 169 denotes a coil layer laminated on the magnetic gap layer 168 and made of for example Cu, 170 denotes a coil-insulation layer formed by for example a thermally cured resist layer to cover the coil layer 169, 171 denotes a coil-lead conductor layer made of for example Cu or NiFe and electrically connected to one end of the coil layer 169, 172 denotes an upper magnetic pole layer made of for example NiFe, NiFeCo, CoFe, FeN or FeZrN to form, with the lower magnetic pole layer 167, magnetic poles and a magnetic yoke, 182 denotes an upper flexible layer laminated on a flattening layer 183 above the upper magnetic pole layer 162 and a heater 174, and 173 denotes a protection layer, respectively.

In this embodiment, the heater 174 is formed at a position, between the lower and upper flexible layers 181 and 182, opposite to the ABS 175 with respect to the magnetic write head element and at substantially the same level or height as that of the write head element. The heater 174 is mainly configured by a heat-transfer layer 176 made of for example NiFe, an insulation layer 177 made of for example $Al_2O_3$, a heating conductor 178 made of for example Cu, Ni, Cr or NiCr, and a heating-conductor insulation layer 179 made of for example a thermally cured resist layer to cover the heating conductor 178.

FIGS. 18a to 18i illustrate, in A—A line sections of FIG. 5, parts of a manufacturing process of the thin-film magnetic head in this embodiment. Hereinafter, the manufacturing process of the thin-film magnetic head in this embodiment will be described in brief using these drawings.

First, as shown in FIG. 18a, the insulation layer 161 is deposited on the substrate 160.

Then, as shown in FIG. 18b, the flexible layer 181 is laminated on the insulation layer 161 by thermally curing a resist material.

Then, as shown in FIG. 18c, the flattening layer 180 is formed on the insulation layer 161 and the flexible layer 181.

Then, as shown in FIG. 18d, the lower shield layer 162, the lower shield gap layer 163, the MR layer 164, the element-lead conductor layers 165 provided with the magnetic bias layers, the upper shield gap layer 166 and the upper shield layer 167 doubling as the lower magnetic pole layer are formed on the flattening layer 180. Also, behind them from the ABS, a flattening layer 180 and the heat-transfer layer 176 of the heater 174 are formed. It is possible to fabricate both the upper shield layer 167 doubling as the lower magnetic pole layer and the heat-transfer layer 176 in the same process.

Then, as shown in FIG. 18e, the magnetic gap layer 168 and the insulation layer 177 are formed thereon. It is possible to fabricate both the magnetic gap layer 168 and the insulation layer 177 in the same process.

Then, as shown in FIG. 18f, the coil layer 169 and the heating conductor 178 are formed on the magnetic gap layer 168 and the insulation layer 177, respectively. If the same material is used for the coil layer 169 and the heating conductor 178, it is possible to fabricate both the coil layer 169 and the heating conductor 178 in the same process.

Thereafter, as shown in FIG. 18g, the coil-insulation layer 170 and the heating-conductor insulation layer 179 are formed to cover the coil layer 169 and the heating conductor 178, respectively. In this case, it is possible to fabricate both the coil-insulation layer 170 and the heating-conductor insulation layer 179 in the same process.

Then, the upper magnetic pole layer 172 and the coil-lead conductor 171 are formed thereon as shown in FIG. 18h. After that, the flattening layer 183 is formed thereon and the upper flexible layer 182 is formed on the flattening layer 183. Then, the protection layer 173 is deposited thereon to fabricate the thin-film magnetic head shown in FIG. 18i.

As mentioned above, in this embodiment, the heater 174 can be formed in the same manufacturing process of coil of the magnetic write head element and is integral with the thin-film magnetic head section. Thus, not only the manufacturing process becomes simple but also variations in the magnetic spacing among thin-film magnetic heads can be greatly reduced.

Configurations, operations and modifications of a read/write circuit of the magnetic disk apparatus in this embodiment are substantially the same as those in the first embodiment. Namely, since the constant currents flow through the heating conductor 188 of the heater 184 during the write operations and the read operations, the heater 184 and the portion around this heater 184 are heated to produce a thermal expansion resulting that the write head element and the read head element are slightly jut or protrude from the ABS 185. Thus, a magnetic spacing that is an air gap between the write and read head elements and the surface of the magnetic disk can be reduced only during the write operations and the read operations. Because the magnetic spacing is reduced only when the write and/or read head elements are operated, it is possible to compensate decreasing in the signal recording ability and/or the signal reproducing ability due to narrowed track width without significantly increasing the probability of occurrence of collision between the magnetic head slider and the surface of the magnetic disk. It should be noted that the magnetic spacing can be precisely adjusted by controlling current flowing through the heating conductor 188 and thus controlling the heating value of the heater 184.

Particularly, according to this embodiment, the lower flexible layer 181 and the upper flexible layer 182 are laminated so as to sandwich the magnetic head elements and the heater 174. Thus, the thermal expansion of the magnetic head element section toward the ABS based upon the heating operation of the heater 174 becomes extremely easy and the thermal expansion is sufficiently oriented toward the easily deformable direction of the flexible layers 181 and 182.

FIG. 19 illustrates a thin-film magnetic head in a modification of the third embodiment, indicated as a B—B line section of FIG. 5.

In the third embodiment, the lower flexible layer 181 and the upper flexible layer 182 are arranged below and above the write and read head elements and the heater 174 to sandwich them. Whereas, in this modification, additional flexible layers 184 and 185 are formed at left and right sides of the write and read head elements and the heater so that these flexible layers 182, 181, 184 and 185 enclose the write and read head elements and the heater. Thus, the thermal expansion of the magnetic head element section toward the ABS becomes extremely easy and the thermal expansion is sufficiently oriented toward the easily deformable direction of the flexible layers.

Other configurations, operations, advantages and modifications in this modification are the same as those in the third embodiment. Therefore, in FIG. 19, the similar elements as those in the third embodiment are represented by the same reference numerals in FIGS. 16, 17 and 18a–18i.

Figure 20:
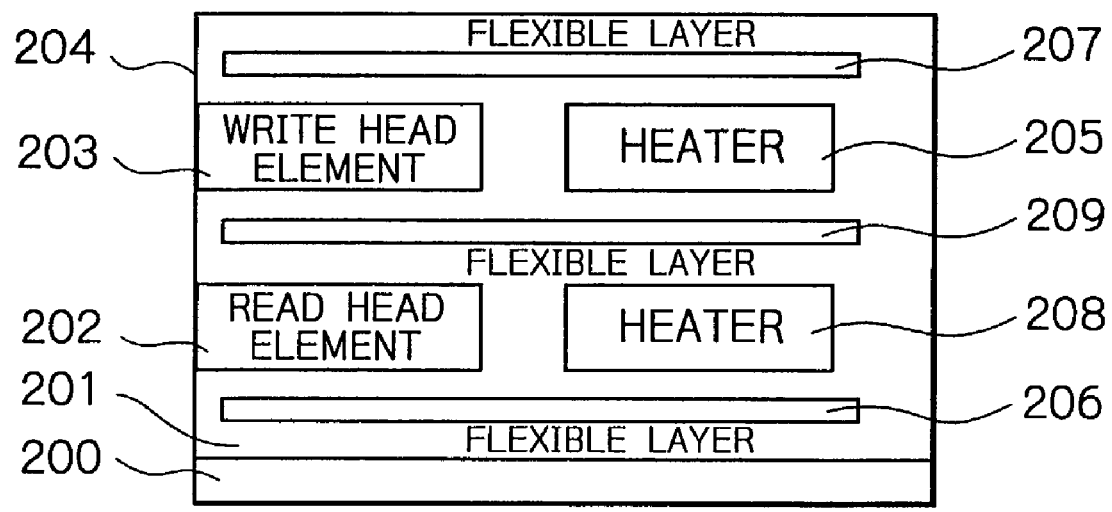
FIG. 20 shows a schematic view illustrating a configuration of a thin-film magnetic head in a fourth embodiment according to the present invention.

FIG. 20 schematically illustrates a configuration of the magnetic head slider or the thin-film magnetic head in a fourth embodiment according to the present invention.

As shown in this figure, the thin-film magnetic head in this embodiment has a substrate 200, an insulation layer 201 formed on the substrate 200, a lower flexible layer 206 formed on the insulation layer 201, and a magnetic read head element 202. A lower heater 208 is formed at a position opposite to the ABS 204 with respect to the read head element 202. Above the read head element 202 and the lower heater 208, a middle flexible layer 209 is laminated. Above the middle flexible layer 209, a write head element 203 is formed. An upper heater 205 is formed at a position opposite to the ABS 204 with respect to the write head element 203. Above the write head element 203 and the upper heater 205, an upper flexible layer 207 is laminated. The lower and upper heaters 208 and 205 operate to jut or protrude end sections of the read head element 202 and the write head element 203 from the ABS due to their thermal expansion, respectively. The lower, middle and upper flexible layers 206, 209 and 207 function to more smooth the movement of the magnetic head elements due to the thermal expansion.

Figure 21:
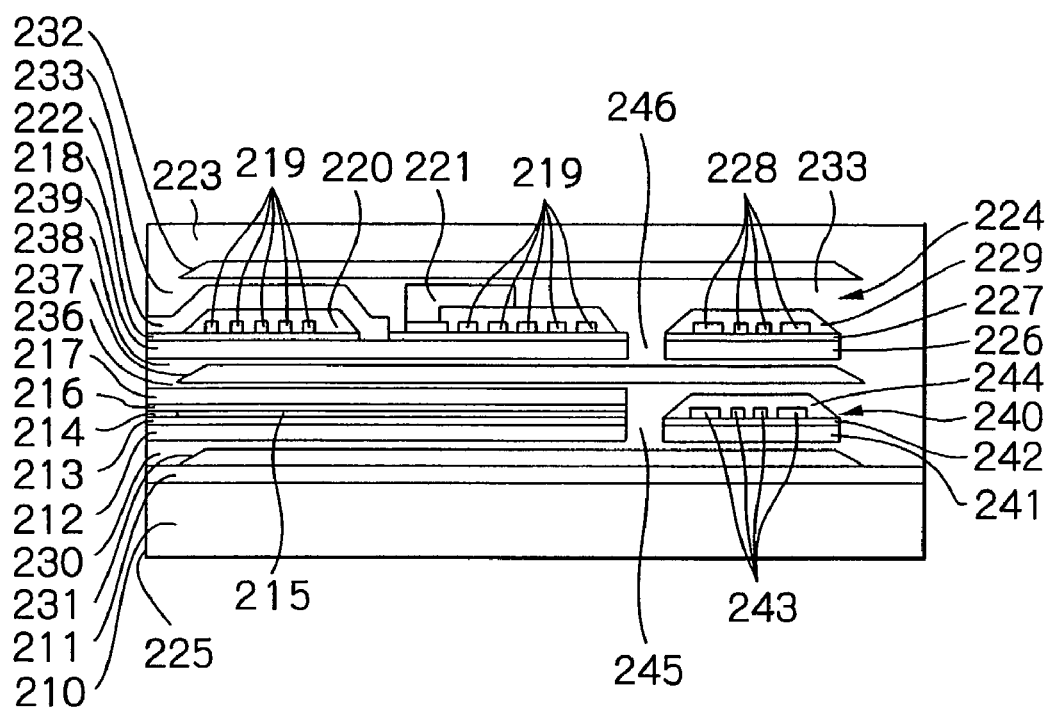
FIG. 21 shows a sectional view illustrating the thin-film magnetic head in the fourth embodiment, indicated as an A—A line section of FIG. 5.
Figure 22:
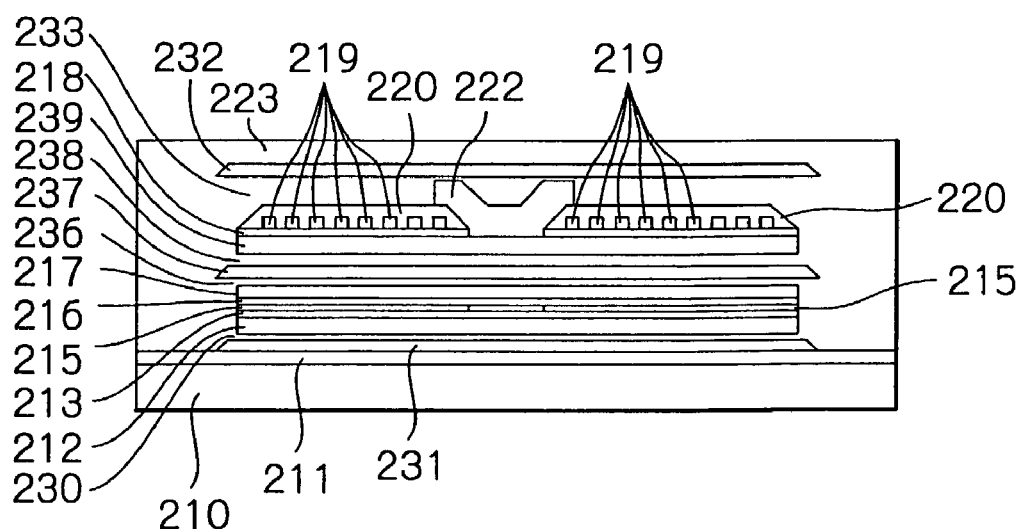
FIG. 22 shows a sectional view illustrating the thin-film magnetic head in the fourth embodiment, indicated as a B—B line section of FIG. 5.

Hereinafter, configuration of this embodiment will be described in detail. FIG. 21 illustrates the thin-film magnetic head in this embodiment, indicated as an A—A line section of FIG. 5, and FIG. 22 illustrates the thin-film magnetic head, indicated as a B—B line section of FIG. 5.

In these figures, reference numeral 210 denotes a substrate made of for example an AlTiC ($Al_2O_3$—TiC), 211 denotes an insulation layer laminated on the substrate 210 and made of for example $Al_2O_3$, 231 denotes a lower flexible layer laminated on the insulation layer 211 and made of for example a thermally cured resist layer, 230 denotes a flattening layer formed on the lower flexible layer 231, 212 denotes a lower shield layer laminated on the flattening layer 230 and made of for example NiFe, NiFeCo, CoFe, FeN or FeZrN, 213 denotes a lower shield gap layer laminated on the lower shield layer 212 and made of for example Al$_2$O$_3$ or DLC, 214 denotes an MR layer such as for example an AMR single layer film, a GMR multi-layered film or a TMR multi-layered film, laminated on the lower shield gap layer 213, 215 denotes element-lead conductor layers made of for example Cu, provided with magnetic bias layers and connected to both ends of the MR layer 214, 216 denotes an upper shield gap layer laminated on the MR layer 214 and the element-lead conductor layers 215 and made of for example Al$_2$O$_3$ or DLC, 217 denotes an upper shield layer laminated on the upper shield gap layer 216 and made of for example NiFe, NiFeCo, CoFe, FeN or FeZrN, 236 denotes a flattening layer laminated on the upper shield layer 217 and the lower heater 240, 237 denotes the middle flexible layer laminated on the flattening layer 236 and made of for example a thermally cured resist layer, 238 denotes a flattening layer laminated thereon, 239 denotes a lower magnetic pole layer laminated on the flattening layer 238 and made of for example NiFe, NiFeCo, CoFe, FeN or FeZrN, 218 denotes a magnetic gap layer laminated on the lower magnetic pole layer 239 and made of for example Al$_2$O$_3$ or DLC, 219 denotes a coil layer laminated on the magnetic gap layer 218 and made of for example Cu, 220 denotes a coil-insulation layer formed by for example a thermally cured resist layer to cover the coil layer 219, 221 denotes a coil-lead conductor layer made of for example Cu or NiFe and electrically connected to one end of the coil layer 219, 222 denotes an upper magnetic pole layer made of for example NiFe, NiFeCo, CoFe, FeN or FeZrN to form, with the lower magnetic pole layer 239, magnetic poles and a magnetic yoke, 232 denotes an upper flexible layer laminated on a flattening layer 233 above the upper magnetic pole layer 222 and an upper heater 224, and 223 denotes a protection layer, respectively.

In this embodiment, the lower heater 240 is formed at a position, between the lower and middle flexible layers 231 and 237, opposite to the ABS 225 with respect to the magnetic read head element and at substantially the same level or height as that of the read head element. Further, the upper heater 224 is formed at a position, between the middle and upper flexible layers 237 and 232, opposite to the ABS 225 with respect to the magnetic write head element and at substantially the same level or height as that of the write head element.

The lower heater 240 is mainly configured by a heat-transfer layer 241 made of for example NiFe, an insulation layer 242 made of for example Al$_2$O$_3$ a heating conductor 243 made of for example Cu, Ni, Cr or NiCr, and a heating-conductor insulation layer 244 made of for example a thermally cured resist layer to cover the heating conductor 243. The upper heater 224 is mainly configured by a heat-transfer layer 226 made of for example NiFe, an insulation layer 227 made of for example Al$_2$O$_3$, a heating conductor 228 made of for example Cu, Ni, Cr or NiCr, and a heating-conductor insulation layer 229 made of for example a thermally cured resist layer to cover the heating conductor 228.

Figure 23N:
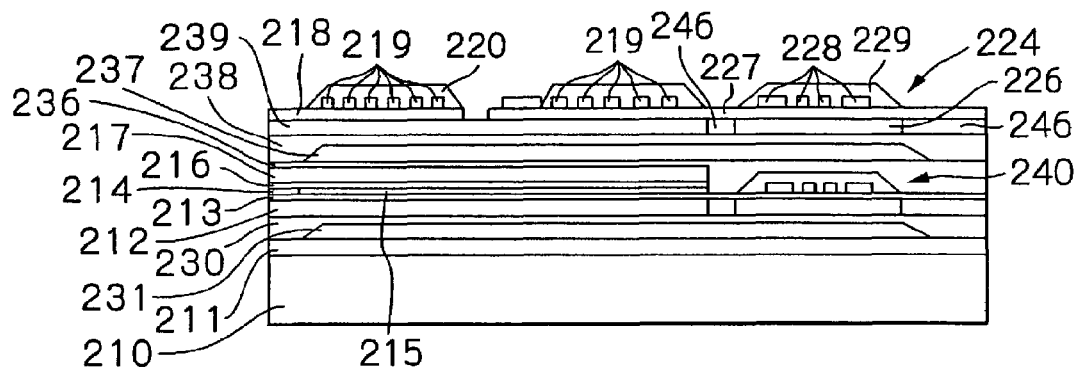
FIGS. 23a to 23p show sectional views illustrating parts of a manufacturing process of the thin-film magnetic head in the fourth embodiment.
Figure 23O:
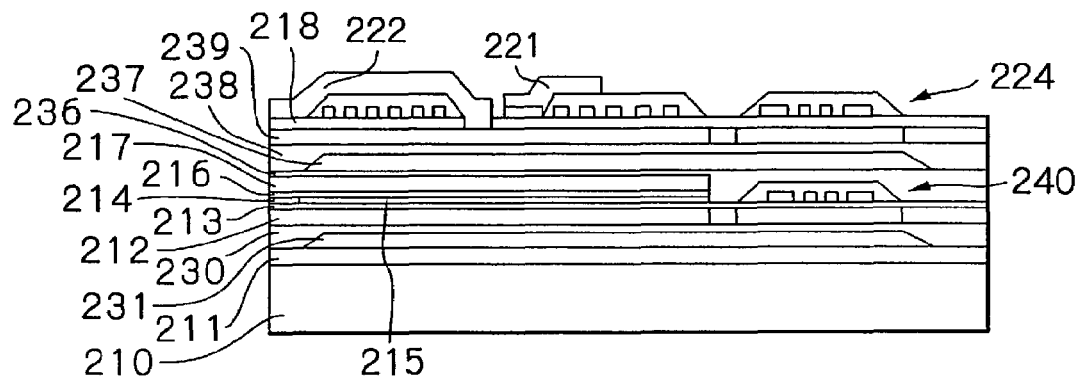
Figure 23P:
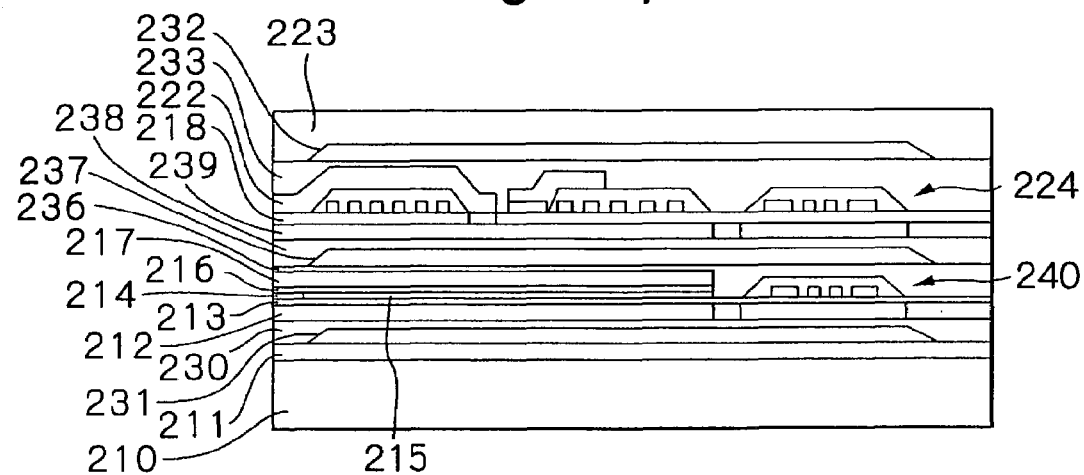

FIGS. 23a to 23p illustrate, in A—A line sections of FIG. 5, parts of a manufacturing process of the thin-film magnetic head in this embodiment. Hereinafter, the manufacturing process of the thin-film magnetic head in this embodiment will be described in brief using these drawings.

First, as shown in FIG. 23a, the insulation layer 211 is deposited on the substrate 210.

Then, as shown in FIG. 23b, the lower flexible layer 231 is laminated on the insulation layer 211 by thermally curing a resist material.

Then, as shown in FIG. 23c, the flattening layer 230 is formed on the insulation layer 211 and the lower flexible layer 231.

Then, as shown in FIG. 23d, the lower shield layer 212 is formed on the flattening layer 230 and also, behind them from the ABS 225, the flattening layer 240 and the heat-transfer layer 241 of the lower heater 240 are formed on the flattening layer 230. It is possible to fabricate both the lower shield layer 212 and the heat-transfer layer 241 in the same process.

Then, as shown in FIG. 23e, the lower shield gap layer 213 and the insulation layer 242 of the lower heater 240 are formed thereon. It is possible to fabricate both the lower shield gap layer 213 and the insulation layer 242 in the same process.

Then, as shown in FIG. 23f, the MR layer 214, the element-lead conductor layers 215 provided with the magnetic bias layers, the upper shield gap layer 216 and the upper shield layer 217 are formed on the lower shield gap layer 213.

Then, as shown in FIG. 23g, the heating conductor 243 is formed on the insulation layer 242 of the lower heater 240, and also, as shown in FIG. 23h, this heating conductor 243 is covered by the heating-conductor insulation layer 244.

Thereafter, as shown in FIG. 23i, the flattening layer 236 is deposited thereon.

Then, as shown in FIG. 23j, the middle flexible layer 237 is laminated on the flattening layer 236 and then the flattening layer 238 is laminated thereon.

Then, as shown in FIG. 23k, the lower magnetic pole layer 239 is formed on the flattening layer 238. Also, behind them from the ABS, a flattening layer 246 and the heat-transfer layer 226 of the upper heater 224 are formed. It is possible to fabricate both the lower magnetic pole layer 239 and the heat-transfer layer 226 in the same process.

Then, as shown in FIG. 23l, the magnetic gap layer 218 and the insulation layer 227 are formed thereon. It is possible to fabricate both the magnetic gap layer 218 and the insulation layer 227 in the same process.

Then, as shown in FIG. 23m, the coil layer 219 and the heating conductor 228 are formed on the magnetic gap layer 218 and the insulation layer 227, respectively. If the same material is used for the coil layer 219 and the heating conductor 228, it is possible to fabricate both the coil layer 219 and the heating conductor 228 in the same process.

Thereafter, as shown in FIG. 23n, the coil-insulation layer 220 and the heating-conductor insulation layer 229 are formed to cover the coil layer 219 and the heating conductor 228, respectively. In this case, it is possible to fabricate both the coil-insulation layer 220 and the heating-conductor insulation layer 229 in the same process.

Then, the upper magnetic pole layer 222 and the coil-lead conductor 221 are formed thereon as shown in FIG. 23o. After that, the flattening layer 223 is formed thereon and the upper flexible layer 232 is formed on the flattening layer 233. Then, the protection layer 223 is deposited thereon to fabricate the thin-film magnetic head shown in FIG. 23p.

As mentioned above, in this embodiment, the upper heater 224 can be formed in the same manufacturing process of coil of the magnetic write head element and also a part of layers of the lower heater 240 can be formed in the same manufacturing process of the magnetic read head element. Thus, these heaters can be formed in integral with the thin-film magnetic head section. Therefore, not only the manufacturing process becomes simple but also variations in the magnetic spacing among thin-film magnetic heads can be greatly reduced.

Figure 24:
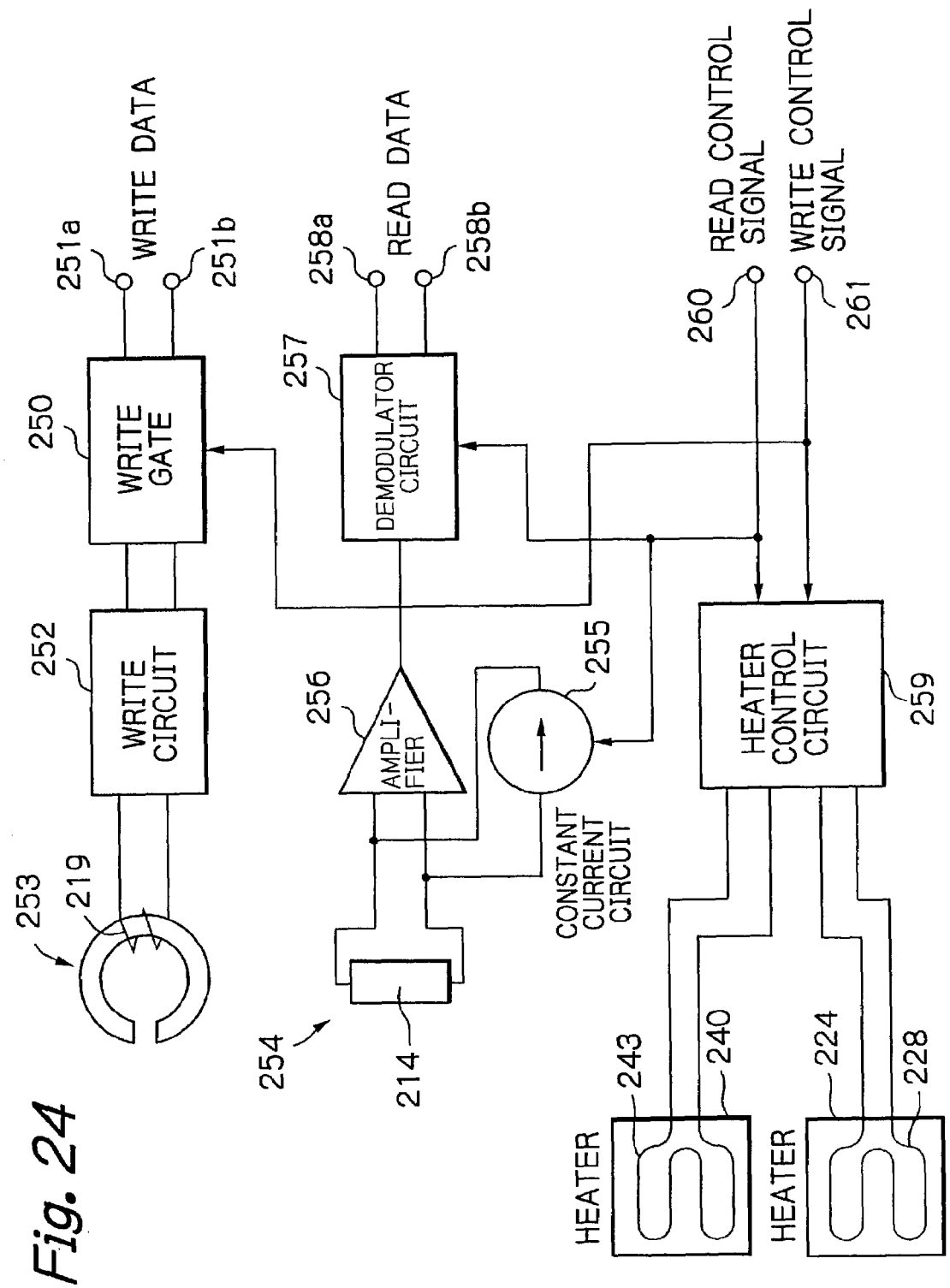
FIG. 24 shows a block diagram illustrating an example of a read/write circuit of the magnetic disk apparatus in the fourth embodiment.

FIG. 24 illustrates an example of the read/write circuit of the magnetic disk apparatus in this embodiment.

In the figure, reference numeral 250 denotes a write gate for receiving write data via input terminals 251a and 251b, 252 denotes a write circuit, 253 denotes an inductive write head element including the lower magnetic pole layer 239, the magnetic gap layer 218, the upper magnetic pole layer 222 and the coil layer 219, 254 denotes an MR read head element including the MR layer 214, 255 denotes a constant current circuit for supplying a sense current to the read head element 254, 256 denotes an amplifier for amplifying output voltage from the read head element 254, 257 denotes a demodulator circuit for providing read data via output terminals 258a and 258b, 259 denotes a control circuit of the lower heater 240 and the upper heater 224, and 260 and 261 denote control terminals for receiving a read control signal and a write control signal, respectively.

Write data applied via the input terminals 251a and 251b are supplied to the write gate 250. The write gate 250 supplies the applied write data to the write circuit 252 only when the write control signal provided thereto through the control terminal 261 instructs to execute write operations. The write circuit 252 generates write current to flow through the coil layer 219 in response to the write data supplied thereto, and thus magnetic recording on the magnetic disk 10 (FIG. 1) by the write head element 253 is performed.

The constant current circuit 255 supplies a constant sense current to the MR layer 214 only when the read control signal provided thereto through the control terminal 260 instructs to execute read operations. Signals reproduced by the read head element 254 is amplified at the amplifier 256, then demodulated at the demodulation circuit 257 and outputted via the output terminals 258a and 258b.

Figure 25:
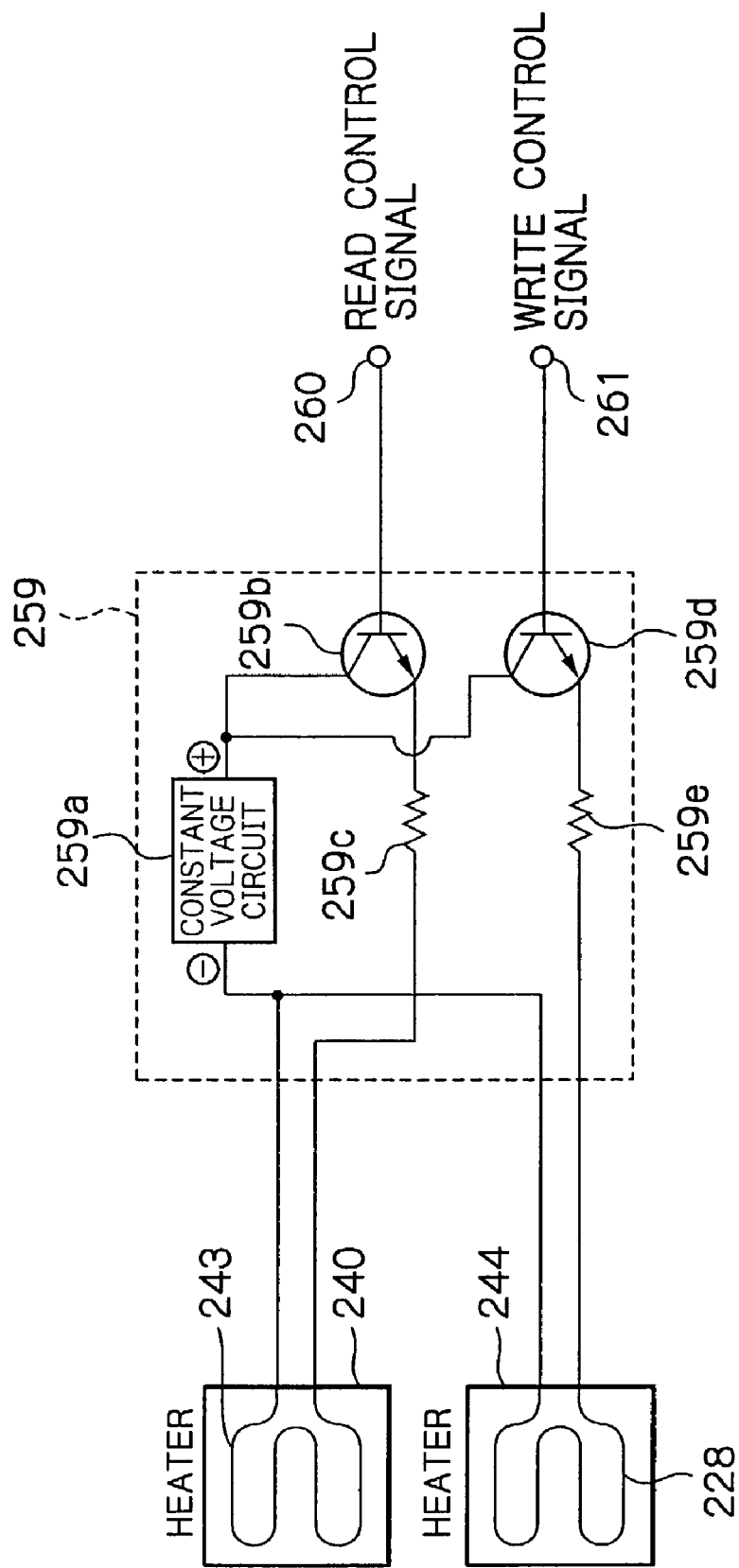
FIG. 25 shows a block diagram illustrating an example of a heater control circuit in the read/write circuit of FIG. 24.

The heater control circuit 259 in this embodiment has as shown in FIG. 25 a first series circuit of a constant voltage circuit 259a, a switching transistor 259b and current adjusting resistor 259c, and a second series circuit of the constant voltage circuit 259a, a switching transistor 259d and current adjusting resistor 259e. The first series circuit is connected across the heating conductor 243 of the lower heater 240, and the second series circuit is connected across the heating conductor 228 of the upper heater 224. To gates of the switching transistors 259b and 259d, the control terminals 260 and 261 are connected, respectively.

When the write control signal indicates to do write operations, the switching transistor 259d turns on to flow a constant current adjusted by the resistor 259e through the heating conductor 228 of the upper heater 224. Also when the read control signal indicates to do read operations, the switching transistor 259b turns on to flow a constant current adjusted by the resistor 259c through the heating conductor 243 of the lower heater 240.

Since the constant current flows through the heating conductor 228 of the upper heater 224 during the write operations and the constant current flows through the heating conductor 243 of the lower heater 240 during the read operations, the upper and lower heaters and the portion around these heaters are heated to produce a thermal expansion resulting that the write head element at the write operations and the read head element at the read operations are slightly jut or protrude from the ABS 225. Thus, a magnetic spacing that is an air gap between the write and read head elements and the surface of the magnetic disk can be reduced only during the write operations and the read operations. Because the magnetic spacing is reduced only when the write or read head element is operated, it is possible to compensate decreasing in the signal recording ability and/or the signal reproducing ability due to narrowed track width without significantly increasing the probability of occurrence of collision between the magnetic head slider and the surface of the magnetic disk. It should be noted that the magnetic spacing can be precisely adjusted by controlling current flowing through the heating conductors 228 and 243 and thus controlling the heating value of the upper and lower heater 224 and 240.

Particularly, according to this embodiment, the lower flexible layer 231 and the middle flexible layer 237 are laminated so as to sandwich the read head element and the lower heater 240 and also the middle flexible layer 237 and the upper flexible layer 232 are laminated so as to sandwich the write head element and the upper heater 224. Thus, the thermal expansion of each magnetic head element section toward the ABS based upon the heating operation of each heater becomes extremely easy and the thermal expansion is sufficiently oriented toward the easily deformable direction of the flexible layers. In addition, according to this embodiment, as each of the write and read head element sections is protruded from the ABS when each of the write and read head elements operates, the magnetic spacing at the necessary head element section can be reduced only when it is needed.

It is apparent that the circuit configuration of the read/write circuit is not limited to that shown in FIGS. 24 and 25. The write operations and the read operations may be specified signals other than the write control signal and the read control signal, respectively. It is desired that the lower and upper heaters are respectively energized during the write operations and the read operations as aforementioned. However, both the lower and upper heaters may be simultaneously energized during the write operations and the read operations.

Figure 26:
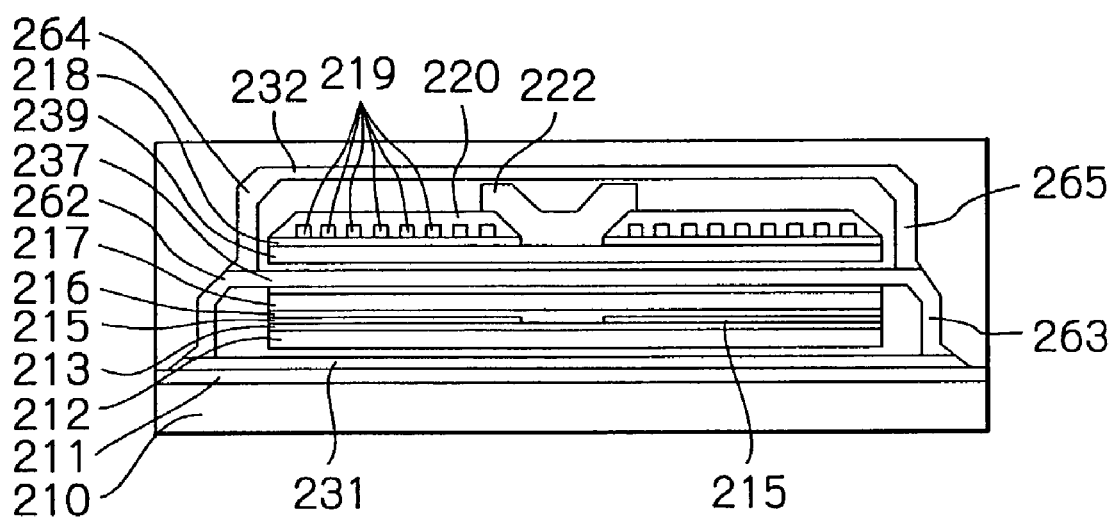
FIG. 26 shows a sectional view illustrating a thin-film magnetic head in a first modification of the fourth embodiment, indicated as a B—B line section of FIG. 5.

FIG. 26 illustrates a thin-film magnetic head in a first modification of the fourth embodiment, indicated as a B—B line section of FIG. 5.

In the fourth embodiment, the lower flexible layer 231 and the middle flexible layer 237 are arranged below and above the read head element and the lower heater 240 to sandwich them, and the middle flexible layer 237 and the upper flexible layer 232 are arranged below and above the write head element and the upper heater 224 to sandwich them. Whereas, in this first modification, additional flexible layers 262 and 263 are formed at left and right sides of the read head element and the lower heater 240 so that these flexible layers 231, 237, 262 and 263 enclose the read head element and the lower heater, and also additional flexible layers 264 and 265 are formed at left and right sides of the write head element and the upper heater 224 so that these flexible layers 237, 232, 264 and 265 enclose the write head element and the upper heater. Thus, the thermal expansion of the magnetic head element section toward the ABS becomes extremely easy and the thermal expansion is sufficiently oriented toward the easily deformable direction of the flexible layers.

Other configurations, operations, advantages and modifications in this modification are the same as those in the fourth embodiment. Therefore, in FIG. 26, the similar elements as those in the fourth embodiment are represented by the same reference numerals in FIGS. 21, 22 and 23a–23p.

Figure 27:
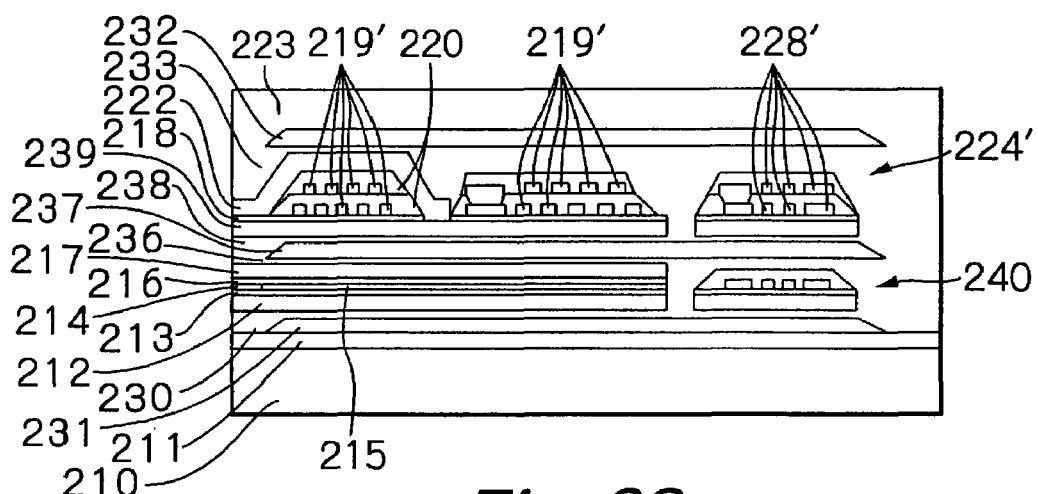
FIG. 27 shows a sectional view illustrating a thin-film magnetic head in a second modification of the fourth embodiment, indicated as an A—A line section of FIG. 5.

FIG. 27 illustrates a thin-film magnetic head in a second modification of the fourth embodiment, indicated as a A—A line section of FIG. 5.

Configurations, operations, advantages and modifications in this second modification are the same as those in the fourth embodiment except that a coil layer 219' in an inductive write head element has a two-layered structure and that a heating conductor 228' of an upper heater 224' has also has a two-layered structure. Therefore, in FIG. 27, the similar elements as those in the fourth embodiment are represented by the same reference numerals in FIGS. 21, 22 and 23a–23p. In this case, the heating conductor of the upper heater may be configured in a single layer structure as well as that in the fourth embodiment.

Figure 28:
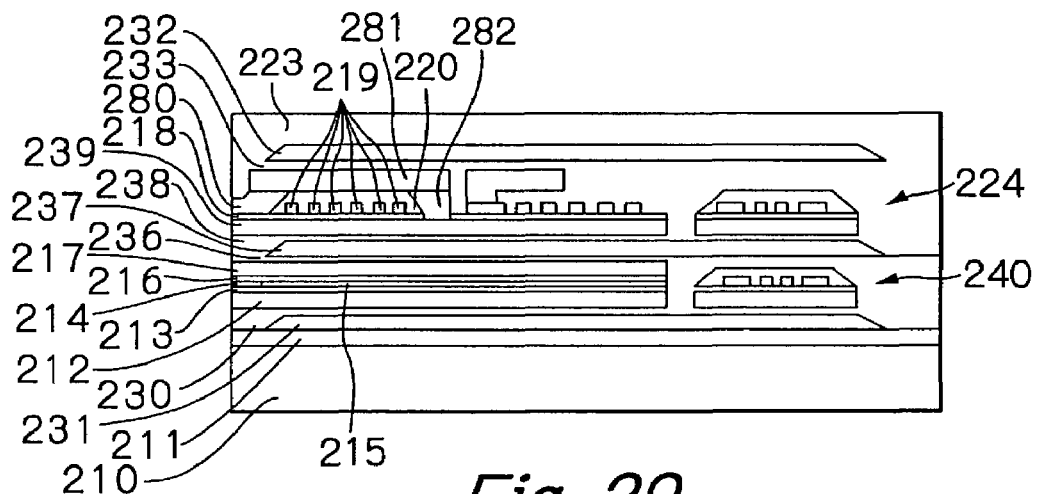
FIG. 28 shows a sectional view illustrating a thin-film magnetic head in a third modification of the fourth embodiment, indicated as an A—A line section of FIG. 5.

FIG. 28 illustrates a thin-film magnetic head in a third modification of the fourth embodiment, indicated as a A—A line section of FIG. 5.

In this third modification, structure of the inductive write head element differs from that in the fourth embodiment. Namely, in this modification, an inductive write head element has a stitched-pole type upper pole consisting of an upper magnetic pole layer 280 made of for example NiFe, NiFeCo, CoFe, FeN or FeZrN, an upper yoke layer 281 magnetically connected to the upper pole layer 280 and made of for example NiFe, NiFeCo, CoFe, FeN or FeZrN, and a back yoke layer 282 magnetically connected to the upper yoke layer 281 and made of for example NiFe, NiFeCo, CoFe, FeN or FeZrN. Other configurations, operations, advantages and modifications in this third modification are the same as those in the fourth embodiment. Therefore, in FIG. 28, the similar elements as those in the fourth embodiment are represented by the same reference numerals in FIGS. 21, 22 and 23a–23p.

Figure 29:
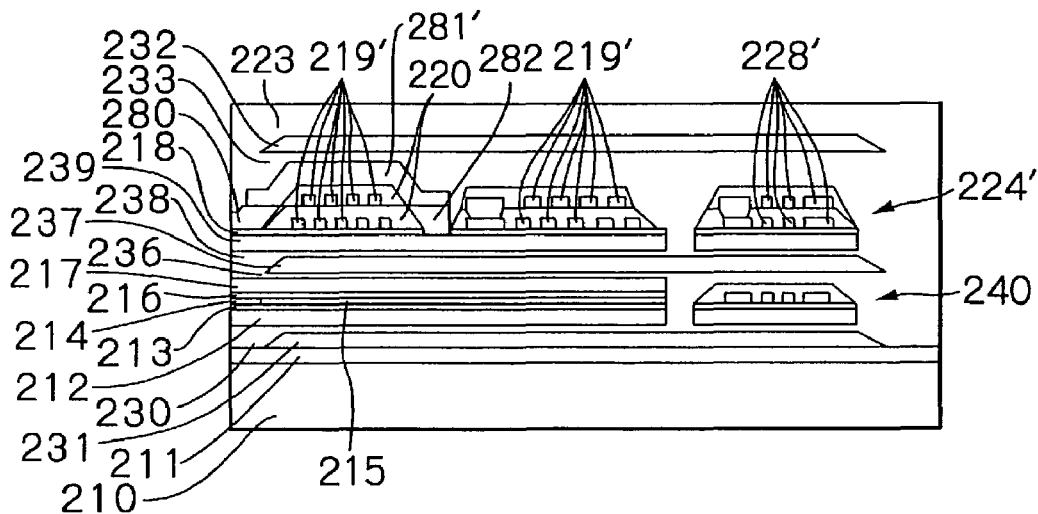
FIG. 29 shows a sectional view illustrating a thin-film magnetic head in a fourth modification of the fourth embodiment, indicated as an A—A line section of FIG. 5.

FIG. 29 illustrates a thin-film magnetic head in a fourth modification of the fourth embodiment, indicated as a A—A line section of FIG. 5.

Configurations, operations, advantages and modifications in this fourth modification are the same as those in the third modification with the stitched-pole type write head element except that a coil layer 219' in an inductive write head element has a two-layered structure and that a heating conductor 228' of an upper heater 224' has also has a two-layered structure. Therefore, in FIG. 29, the similar elements as those in the third modification are represented by the same reference numerals in FIG. 28. In this case, the heating conductor of the upper heater may be configured in a single layer structure as well as that in the fourth embodiment.

Figure 30:
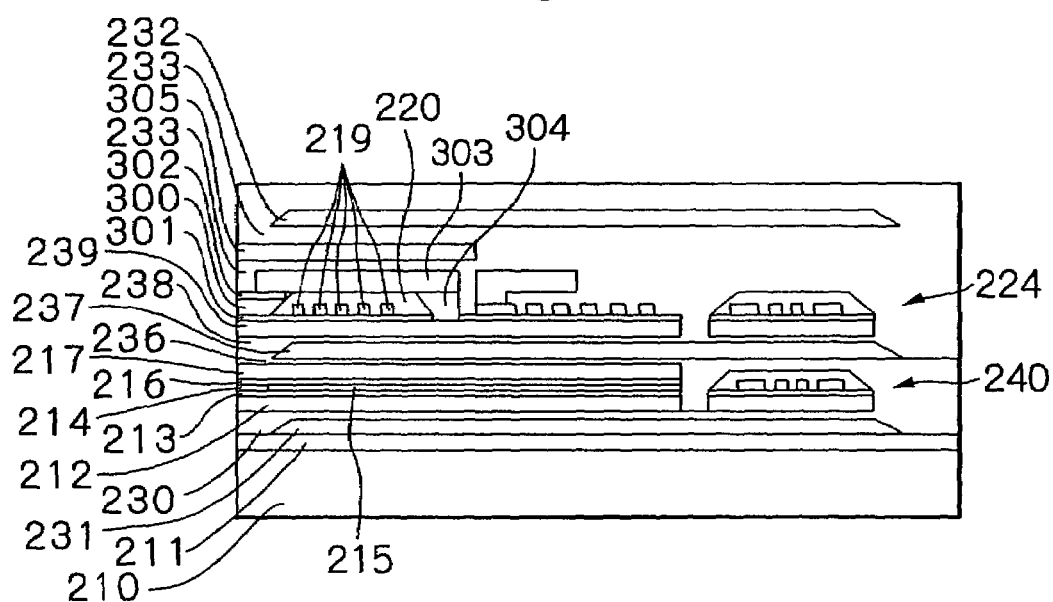
FIG. 30 shows a sectional view illustrating a thin-film magnetic head in a fifth modification of the fourth embodiment, indicated as an A—A line section of FIG. 5.

FIG. 30 illustrates a thin-film magnetic head in a fifth modification of the fourth embodiment, indicated as a A—A line section of FIG. 5.

In this fifth modification, structure of the inductive write head element differs from that in the fourth embodiment. Namely, in this modification, the inductive write head element has a perpendicular-magnetic recording structure consisting of a lower magnetic pole layer 239, insulation layers 300 and 301, a coil layer 219, an upper magnetic pole layer 302 made of for example NiFe, NiFeCo, CoFe, FeN or FeZrN, an upper yoke layer 303 magnetically connected to the upper pole layer 302 and made of for example NiFe, NiFeCo, CoFe, FeN or FeZrN, a back yoke layer 304 magnetically connected to the upper yoke layer 303 and made of for example NiFe, NiFeCo, CoFe, FeN or FeZrN, and a write shield layer 305 made of for example NiFe, NiFeCo, CoFe, FeN or FeZrN. Other configurations, operations, advantages and modifications in this fifth modification are the same as those in the fourth embodiment. Therefore, in FIG. 30, the similar elements as those in the fourth embodiment are represented by the same reference numerals in FIGS. 21, 22 and 23a–23p.

Figure 31:
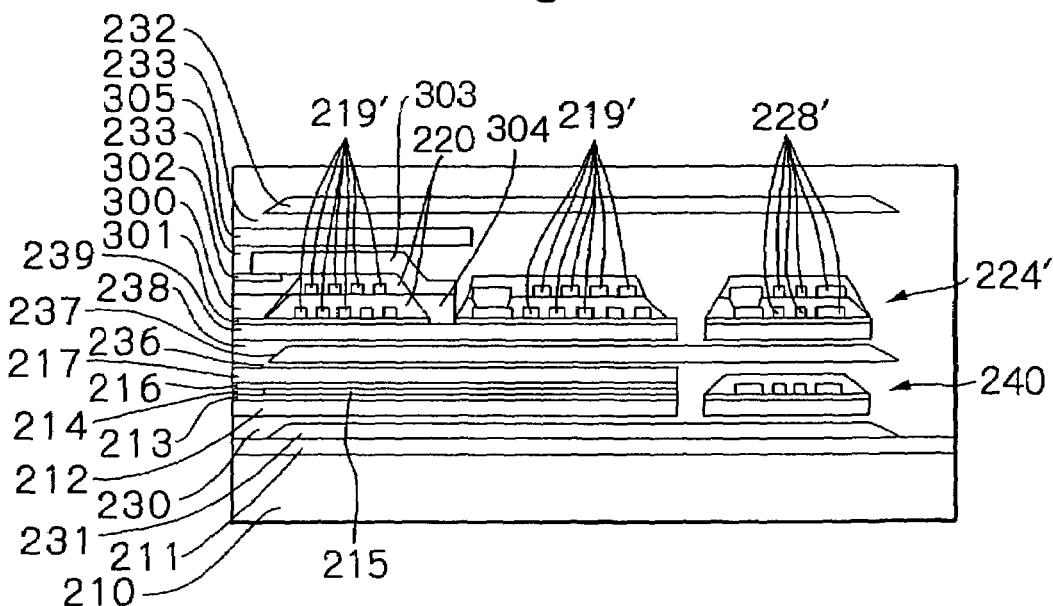
FIG. 31 shows a sectional view illustrating a thin-film magnetic head in a sixth modification of the fourth embodiment, indicated as an A—A line section of FIG. 5.

FIG. 31 illustrates a thin-film magnetic head in a sixth modification of the fourth embodiment, indicated as a A—A line section of FIG. 5.

Configurations, operations, advantages and modifications in this sixth modification are the same as those in the fifth modification with the perpendicular-magnetic recording type write head element except that a coil layer 219' in the inductive write head element has a two-layered structure and that a heating conductor 228' of an upper heater 224' has also has a two-layered structure. Therefore, in FIG. 31, the similar elements as those in the fifth modification are represented by the same reference numerals in FIG. 30. In this case, the heating conductor of the upper heater may be configured in a single layer structure as well as that in the fourth embodiment.

It is apparent that the aforementioned second to sixth modifications of the fourth embodiment can be similarly applied to the first to third embodiment.

Many widely different embodiments of the present invention may be constructed without departing from the spirit and scope of the present invention. It should be understood that the present invention is not limited to the specific embodiments described in the specification, except as defined in the appended claims.

What is claimed is:

1. A thin-film magnetic head comprising:
   at least one thin-film magnetic head element with an end surface at a same side as an air bearing surface; and
   at least one heating means located at a rear of said at least one thin-film magnetic head element, with respect to the air bearing surface, said at least one heating means being energized to heat at least when said at least one thin-film magnetic head element operates,
   said end surface of said at least one thin-film magnetic head element protruding when said at least one heating means is energized.

2. The thin-film magnetic head as claimed in claim 1, wherein said at least one thin-film magnetic head element comprises a magnetic write head element or a magnetic read head element.

3. The thin-film magnetic head as claimed in claim 2, wherein said at least one heating means comprises a single heating means located at the rear of said magnetic write head element or said magnetic read head element with respect to the air bearing surface.

4. The thin-film magnetic head as claimed in claim 1, wherein said at least one thin-film magnetic head element comprises a magnetic write head element and a magnetic read head element laminated with each other.

5. The thin-film magnetic head as claimed in claim 4, wherein said at least one heating means comprises a single heating means located at the rear of said magnetic write head element or said magnetic read head element with respect to the air bearing surface.

6. The thin-film magnetic head as claimed in claim 3, wherein said at least one heating means comprises two heating means located at the rear of said magnetic write head element and said magnetic read head element with respect to the air bearing surface, respectively.

7. The thin-film magnetic head as claimed in claim 1, wherein said head further comprises at least one flexible layer laminated along said at least one thin-film magnetic head element and said at least one heating means.

8. The thin-film magnetic head as claimed in claim 7, wherein said at least one flexible layer comprises a single flexible layer laminated below or above said at least one thin-film magnetic head element and said at least one heating means.

9. The thin-film magnetic head as claimed in claim 7, wherein said at least one flexible layer comprises two flexible layers laminated below and above said at least one thin-film magnetic head element and said at least one heating means.

10. The thin-film magnetic head as claimed in claim 9, wherein said head further comprises additional flexible layers located at left and right sides of said at least one thin-film magnetic head element and said at least one heating means.

11. The thin-film magnetic head as claimed in claim 6, wherein said head further comprises three flexible layers laminated along said two heating means, said magnetic write head element and said magnetic read head element, two of said three flexible layers being laminated below and above said two heating means, said magnetic write head element and said magnetic read head element, the remaining one of said three flexible layers being laminated between said two heating means and between said magnetic write head element and said magnetic read head element.

12. The thin-film magnetic head as claimed in claim 11, wherein said head further comprises additional flexible layers located at left and right sides of said two heating means, said magnetic write head element and said magnetic read head element.

13. The thin-film magnetic head as claimed in claim 1, wherein said at least one heating means comprises a heating conductor for producing Joule heat in response to current flowing there through.

14. A head gimbal assembly including a thin-film magnetic head with at least one thin-film magnetic head element and at least one heating means, a support means for supporting said thin-film magnetic head, signal lead lines connected to said at least one thin-film magnetic head element, and power lead lines for supplying current to said at least one heating means,
said at least one heating means being located at a rear of said at least one thin-film magnetic with respect to the air bearing surface, and energized to heat at least when said at least one thin-film magnetic head element operates,
said at least one thin-film magnetic head element having an end surface at a same side as the air bearing surface, said end surface protruding when said at least one heating means is energized.

15. The head gimbal assembly as claimed in claim 14, wherein said at least one thin-film magnetic head element comprises a magnetic write head element or a magnetic read head element.

16. The head gimbal assembly as claimed in claim 15, wherein said at least one heating means comprises a single heating means located at the rear of said magnetic write head element or said magnetic read head element with respect to the air bearing surface.

17. The head gimbal assembly as claimed in claim 14, wherein said at least one thin-film magnetic head element comprises a magnetic write head element and a magnetic read head element laminated with each other.

18. The head gimbal assembly as claimed in claim 17, wherein said at least one heating means comprises a single heating means located at the rear of said magnetic write head element or said magnetic read head element with respect to the air bearing surface.

19. The head gimbal assembly as claimed in claim 17, wherein said at least one heating means comprises two heating means located at the rear of said magnetic write head element and said magnetic read head element with respect to the air bearing surface, respectively.

20. The head gimbal assembly as claimed in claim 14, wherein said thin-film magnetic head comprises at least one flexible layer laminated along said at least one thin-film magnetic head element and said at least one heating means.

21. The head gimbal assembly as claimed in claim 20, wherein said at least one flexible layer comprises a single flexible layer laminated below or above said at least one thin-film magnetic head element and said at least one heating means.

22. The head gimbal assembly as claimed in claim 20, wherein said at least one flexible layer comprises two flexible layers laminated below and above said at least one thin-film magnetic head element and said at least one heating means.

23. The head gimbal assembly as claimed in claim 22, wherein said thin-film magnetic head comprises additional flexible layers located at left and right sides of said at least one thin-film magnetic head element and said at least one heating means.

24. The head gimbal assembly as claimed in claim 19, wherein said thin-film magnetic head comprises three flexible layers laminated along said two heating means, said magnetic write head element and said magnetic read head element, two of said three flexible layers being laminated below and above said two heating means, said magnetic write head element and said magnetic read head element, the remaining one of said three flexible layers being laminated between said two heating means and between said magnetic write head element and said magnetic read head element.

25. The head gimbal assembly as claimed in claim 24, wherein said head further comprises additional flexible layers located at left and right sides of said two heating means, said magnetic write head element and said magnetic read head element.

26. The head gimbal assembly as claimed in claim 14, wherein said at least one heating means comprises a heating conductor for producing Joule heat in response to current flowing there through.

27. A magnetic disk apparatus including at least one head gimbal assembly and a current control means,
said at least one head gimbal assembly including a thin-film magnetic head with at least one thin-film magnetic head element and at least one heating means, a support means for supporting said thin-film magnetic head, signal lead lines connected to said at least one thin-film magnetic head element, and power lead lines for supplying current to said at least one heating means,
said at least one heating means being located at a rear of said at least one thin-film magnetic head element with respect to the air bearing surface, and energized to heat at least when said at least one thin-film magnetic head element operates,
said at least one thin-film magnetic head element having an end surface at a same side as the air bearing surface, said end surface protruding when said at least one heating means is energized,
said current control means controlling current supplied to said at least one heating means.

28. The magnetic disk apparatus as claimed in claim 27, wherein said current control means comprises means for supplying current to said at least one heating means only when said at least one thin-film magnetic head element operates.

29. The magnetic disk apparatus as claimed in claim 27, wherein said at least one thin-film magnetic head element comprises a magnetic write head element or a magnetic read head element.

30. The magnetic disk apparatus as claimed in claim 29, wherein said at least one heating means comprises a single heating means located at the rear of said magnetic write head element or said magnetic read head element with respect to the air bearing surface.

31. The magnetic disk apparatus as claimed in claim 27, wherein said at least one thin-film magnetic head element comprises a magnetic write head element and a magnetic read head element laminated with each other.

32. The magnetic disk apparatus as claimed in claim 31, wherein said at least one heating means comprises a single heating means located at the rear of said magnetic write head element or said magnetic read head element with respect to the air bearing surface.

33. The magnetic disk apparatus as claimed in claim 32, wherein said current control means comprises means for supplying current to said single heating means only when said magnetic write head element or said magnetic read head element operates.

34. The magnetic disk apparatus as claimed in claim 31, wherein said at least one heating means comprises two heating means located at the rear of said magnetic write head element and said magnetic read head element with respect to the air bearing surface, respectively.

35. The magnetic disk apparatus as claimed in claim 34, wherein said current control means comprises means for supplying current to said two heating means only when said magnetic write head element and said magnetic read head element operate, respectively.

* * * * *

UNITED STATES PATENT AND TRADEMARK OFFICE
CERTIFICATE OF CORRECTION

PATENT NO. : 7,068,468 B2
APPLICATION NO. : 10/303849
DATED : June 27, 2006
INVENTOR(S) : Akifumi Kamijima It is certified that error appears in the above-identified patent and that said Letters Patent is hereby corrected as shown below:

Title Page
Page 1, (73) Assignee:, change "Co TDK Corporation" to --TDK Corporation--.

Signed and Sealed this

Fourteenth Day of November, 2006

JON W. DUDAS
*Director of the United States Patent and Trademark Office*